(12) United States Patent
Childers et al.

(10) Patent No.: US 10,712,507 B2
(45) Date of Patent: Jul. 14, 2020

(54) FIELD CHANGEABLE FIBER OPTIC CONNECTOR POLARITY KEYING

(71) Applicant: US Conec, Ltd, Hickory, NC (US)

(72) Inventors: Darrell R. Childers, Hickory, NC (US); Craig M. Conrad, Hickory, NC (US); Jason Higley, Hickory, NC (US); Jillcha F. Wakjira, Hickory, NC (US)

(73) Assignee: US Conec, Ltd, Hickory, NC (US)

( * ) Notice: Subject to any disclaimer, the term of this patent is extended or adjusted under 35 U.S.C. 154(b) by 0 days.

(21) Appl. No.: 16/221,875

(22) Filed: Dec. 17, 2018

(65) Prior Publication Data

US 2019/0121032 A1  Apr. 25, 2019

Related U.S. Application Data

(63) Continuation-in-part of application No. 16/164,382, filed on Oct. 18, 2018, which is a continuation of application No. 15/881,866, filed on Jan. 29, 2018, now Pat. No. 10,107,969, which is a continuation of application No. 15/383,881, filed on Dec. 19, 2016, now Pat. No. 9,880,361.

(60) Provisional application No. 62/269,946, filed on Dec. 19, 2015, provisional application No. 62/599,311, filed on Dec. 15, 2017.

(51) Int. Cl.
*G02B 6/38* (2006.01)

(52) U.S. Cl.
CPC ......... *G02B 6/3831* (2013.01); *G02B 6/3821* (2013.01); *G02B 6/3885* (2013.01); *G02B 6/3893* (2013.01); *G02B 6/3895* (2013.01); *G02B 6/3898* (2013.01)

(58) Field of Classification Search
None
See application file for complete search history.

(56) References Cited

U.S. PATENT DOCUMENTS

| | | |
|---|---|---|
| 5,071,219 A | 12/1991 | Yurtin |
| 5,166,995 A | 11/1992 | Briggs et al. |
| 5,521,997 A | 5/1996 | Rovenolt et al. |
| 6,062,739 A | 5/2000 | Blake |
| 6,364,537 B1 | 4/2002 | Maynard |
| 6,422,760 B1 | 7/2002 | Matasek |
| 6,604,862 B2 | 8/2003 | Rogge |
| 7,047,773 B1 | 5/2006 | Lin |
| 7,104,702 B2 | 9/2006 | Barnes |
| 7,150,567 B1 | 12/2006 | Luther |
| 9,829,645 B2 | 11/2017 | Good et al. |
| 2001/0026661 A1 | 10/2001 | De et al. |
| 2011/0293223 A1 | 12/2011 | Shimazu et al. |
| 2013/0266279 A1 | 10/2013 | Nishioka |
| 2014/0161392 A1 | 6/2014 | Gurreri |
| 2015/0241644 A1 | 8/2015 | Lee |
| 2016/0259135 A1 | 9/2016 | Gniadek et al. |
| 2017/0102505 A1 | 4/2017 | Nguyen |

(Continued)

*Primary Examiner* — Jerry Rahll
(74) *Attorney, Agent, or Firm* — Michael L. Leetzow, P.A.; Shubhrangshu Sengupta

(57) ABSTRACT

A fiber optic connector along with a tool allows for the changing of the polarity of the fiber optic connector. Keys may be installed in both the top and the bottom of the fiber optic connector, one in a first position and the other in a second position. Using the tool in one back-and-forth motion, the polarity of the fiber optic connector can be changed. The keys have a configuration that resist an incorrect insertion and provide better retention of the keys in the correct configuration due to a better retention force.

20 Claims, 27 Drawing Sheets

(56) References Cited

U.S. PATENT DOCUMENTS

2017/0205589 A9    7/2017   Nguyen
2018/0128987 A1    5/2018   Good et al.

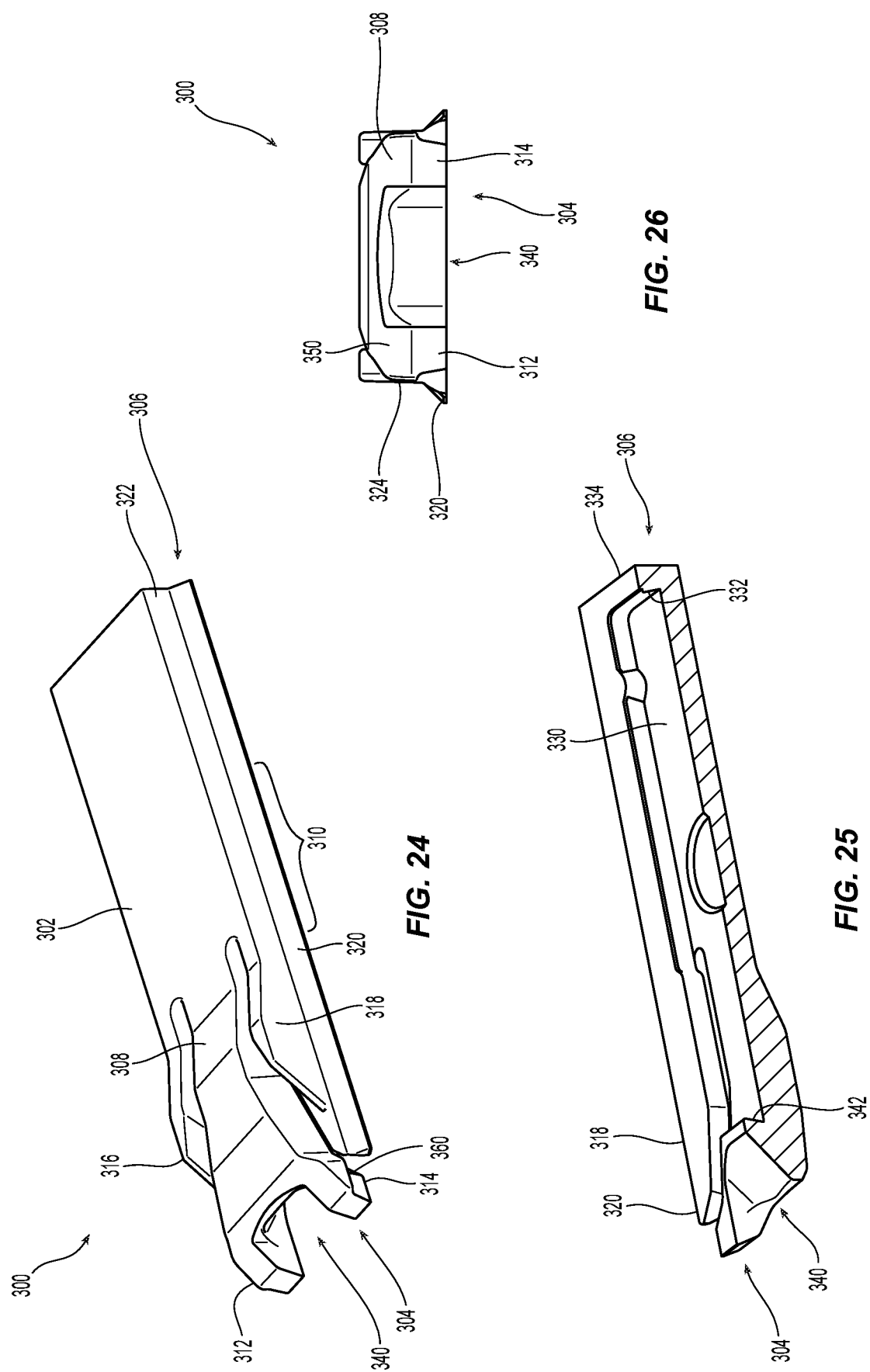

FIELD CHANGEABLE FIBER OPTIC CONNECTOR POLARITY KEYING

REFERENCE TO RELATED CASE

This application claims priority under 35 U.S.C. § 119 (e) to provisional application No. 62/269,946 filed on Dec. 19, 2015, and to provisional application No. 62/599,311 filed on Dec. 15, 2017, and under 35 U.S.C. § 120 to U.S. patent application Ser. No. 15/383,881, filed Dec. 19, 2016, and to U.S. patent application Ser. No. 15/881,866, filed Jan. 29, 2018, and to U.S. patent application Ser. No. 16/164,382, filed on Oct. 18, 2018, the contents of which are hereby incorporated by reference in their entirety.

BACKGROUND OF THE INVENTION

Field of the Invention

Fiber optic jumper cables are used to connect various pieces of telecommunications equipment. These fiber optic jumper cables typically have 12 or more optical fibers in them and are terminated using fiber optic ferrules. The fiber optic jumper cables are either plugged directly into telecommunications equipment (e.g., a transceiver, etc.) or are connected to another fiber optic jumper cable by use of an adapter. Since the fiber optic jumper cables have a number of optical fibers, the routing of those optical fibers is important to ensure that signals traveling on the optical fibers reach the intended destination and in the correct position in the telecommunications equipment or the other fiber optic jumper cable. Thus, the fiber optic jumper cables have a polarity, which is dictated by the positioning of the optical fibers secured in the fiber optic ferrules. Each of the fiber optic ferrules has a particular orientation, and the relationship of the position of the optical fibers to the fiber optic ferrule determines the polarity. However, there are times that the polarity of the fiber optic connector needs to be changed in the field due to changes in the routing, equipment, or design, or simply because the customer ordered the incorrect polarity. However, changing the polarity in the field would require that the connector housing be changed, while the optical fibers are attached. This is tricky, time consuming, and, most importantly, may damage the connector, the optical fibers or the entire fiber optic jumper cable.

Thus, a fiber optic connector that allows for the polarity to be changed in the field without removing any of other components of the fiber optic connector is needed.

SUMMARY OF THE INVENTION

The present invention is directed to fiber optic connector that includes an inner connector housing, the inner connecting housing having a top portion and a bottom portion connected by two side portions, an outer connector housing surrounding at least a portion of the inner connector housing, a key disposed in a recessed portion of the inner housing, the key having a cantilevered portion extending from a central portion towards a front end thereof, a first latch disposed on the cantilevered portion and having a surface facing a rear end of the key to engage a forward facing surface in one portion of the fiber optic connector housing to prevent the key from moving rearwardly upon application of a rearward force to the key.

In some embodiments, there are first and second portions extending along of a portion of the cantilevered portion on opposite sides thereof.

In some other embodiments, front end of the key has a wall in front of the cantilevered portion to guard the first latch.

In another embodiment, a key to be disposed in a portion of a fiber optic connector housing that includes a main body extending between a front end and a rear end, a cantilevered portion extending from a central portion of the main body towards the front end, first and second portions extending along of a portion of the cantilevered portion on opposite sides thereof, and a first latch on the cantilevered portion and having a surface facing the rear end of the key and to engage a forward facing surface in the portion of the fiber optic connector housing to prevent the key from moving rearwardly upon application of a rearward force to the key.

In yet another embodiment, there is a key to be disposed in a portion of a housing of a fiber optic connector that includes a main body extending between a front end and a rear end; and a cantilevered portion extending from a central portion of the main body towards the front end and having a latch thereupon, the cantilevered portion being in a relaxed first state in a first position in an adapter and being in a compressed second state when in a second position in the adapter.

According to another aspect of the present invention, there is a fiber optic connector that includes a fiber optic ferrule, an inner connector housing surrounding at least a portion of the fiber optic ferrule, the inner connecting housing having a top portion and a bottom portion connected by two side portions, the top and bottom portions having an outer surface and a thickness, an outer connector housing surrounding at least a portion of the inner connector housing, the outer connector housing movable relative to the inner connector housing, a top recessed portion on the top portion of the inner connector housing, the top recessed portion extending into the thickness of the top portion, a bottom recessed portion on the bottom portion of the inner connector housing, the bottom recessed portion extending into the thickness of the bottom portion, a forward facing surface and a rearward facing surface disposed in each of the top and bottom recessed portions, and a first key to be disposed within the top recessed portion and a second key disposed within the bottom recessed portion, each of the first and second keys having a first latch to engage the forward facing surface in a first position and a second latch to engage the rearward facing surface to prevent removal of the first and second keys from the fiber optic connector.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention, and together with the description, serve to explain the principles and operations of the invention.

BRIEF DESCRIPTION OF THE DRAWINGS

FIG. 24 is a perspective view of an embodiment of a key to be disposed in a portion of a fiber optic connector housing according to the present invention;

FIG. 25 is a bottom perspective view of a cross section of the key in FIG. 24;

FIG. 26 is a front elevation view of the key in FIG. 24;

DETAILED DESCRIPTION OF THE PREFERRED EMBODIMENTS

Figure 1:
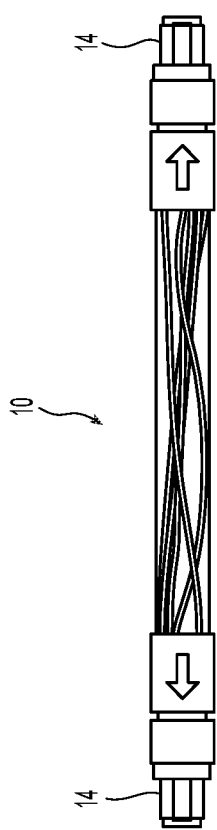
FIG. 1 is a planar view of a Type A jumper.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
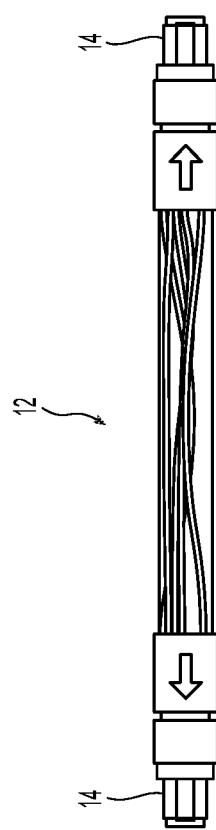
FIG. 2 is a planar view of a Type B jumper.

Further to the above discussion, illustrated in FIGS. 1-6 are components of a fiber optic jumper cable, the adapters and routing pattern of the optical fibers. There are two types of fiber optic jumper cables, which are illustrated in FIGS. 1 and 2. In FIG. 1 is a Type A fiber optic jumper cable 10 while FIG. 2 is a Type B fiber optic jumper cable 12. In a Type A fiber optic jumper cable, the optical fibers are in the same position at both ends (as one looks at the end of the fiber optic ferrule with the keys 14, in the same direction). It should be noted that with the keys up at both ends in a Type A fiber optic jumper cable, the fibers are crossed over the length of the jumper. If the keys were opposite (one of the keys not pointing up, but rather down into the page, then the optical fibers would appear to run straight from one end to the other). In a Type B fiber optic jumper cable, the optical fibers are reversed. For example, the optical fiber in position 1 in one fiber optic ferrule is in position 12 of the fiber optic ferrule at the other end. As a result, the person designing the system needs to be aware of the optical paths that are required when ordering the fiber optic jumper cables.

Figure 3:
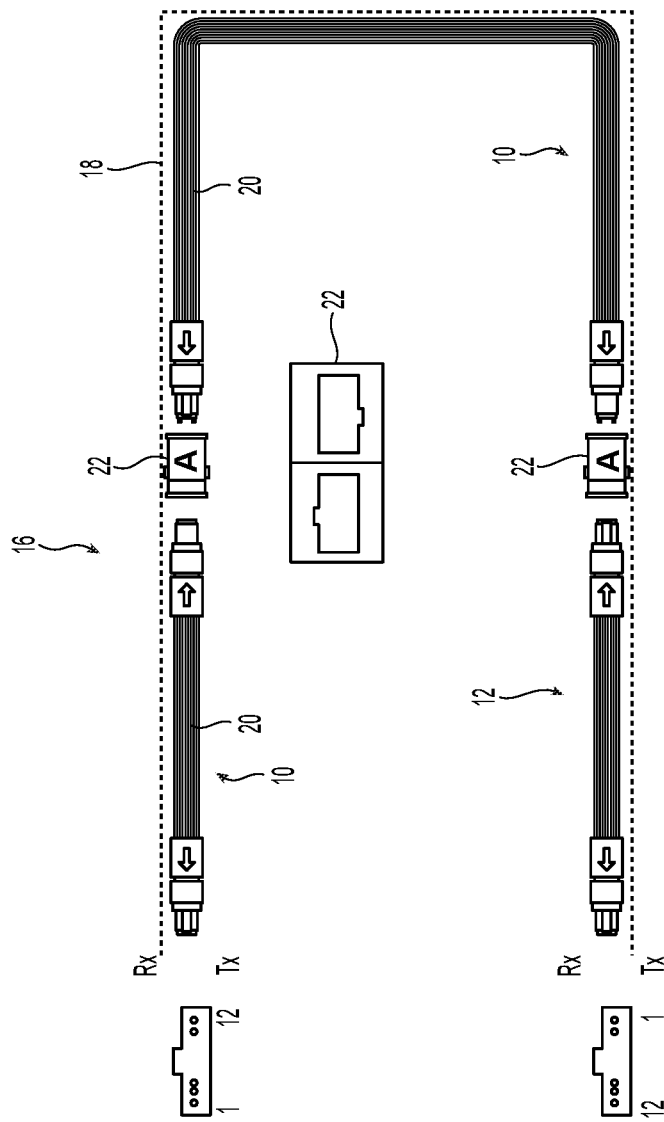
FIG. 3 illustrates a connectivity method for using Type A adapters.

As an example, FIG. 3 illustrates a system 16 that uses an A-type connectivity system. The uncoupled ends of the fiber optic jumper cables illustrated on the left side are to be mated with a transceiver (not shown). As is known in the art, there are positions for transmitting signals (Tx) and receiving signals (Rx). It is important that the fiber optic jumper cables 10,12 are designed so that the transmit position in one of the transceivers is mated with a receive position in the other. One optical path 18 is illustrated by the solid line around the system 16. The transmit position on the bottom transceiver (at position 1) needs to reach the receive position 1 on the transceiver at the top. So, with the optical fibers 20 being all parallel to one another, there are two Type A fiber optic jumper cables and one Type B fiber optic jumper cable required to achieve that result. As illustrated in middle of the system 16, a Type A adapter 22—to join the ends of the fiber optic jumper cables—is used and the illustration shows the configuration from both ends. So, the Type A adapter has one side with the key up and the other side with the key down. See also FIG. 5. Thus, if one type A and two type B fiber optic jumper cables are ordered, then the system 16 will not work. It would be better if the key at one end of the fiber optic jumper cables could be changed (or if the keys can be easily changed, then only one type of jumper needs to be ordered and they can be oriented in any fashion by the end customer).

Figure 4:
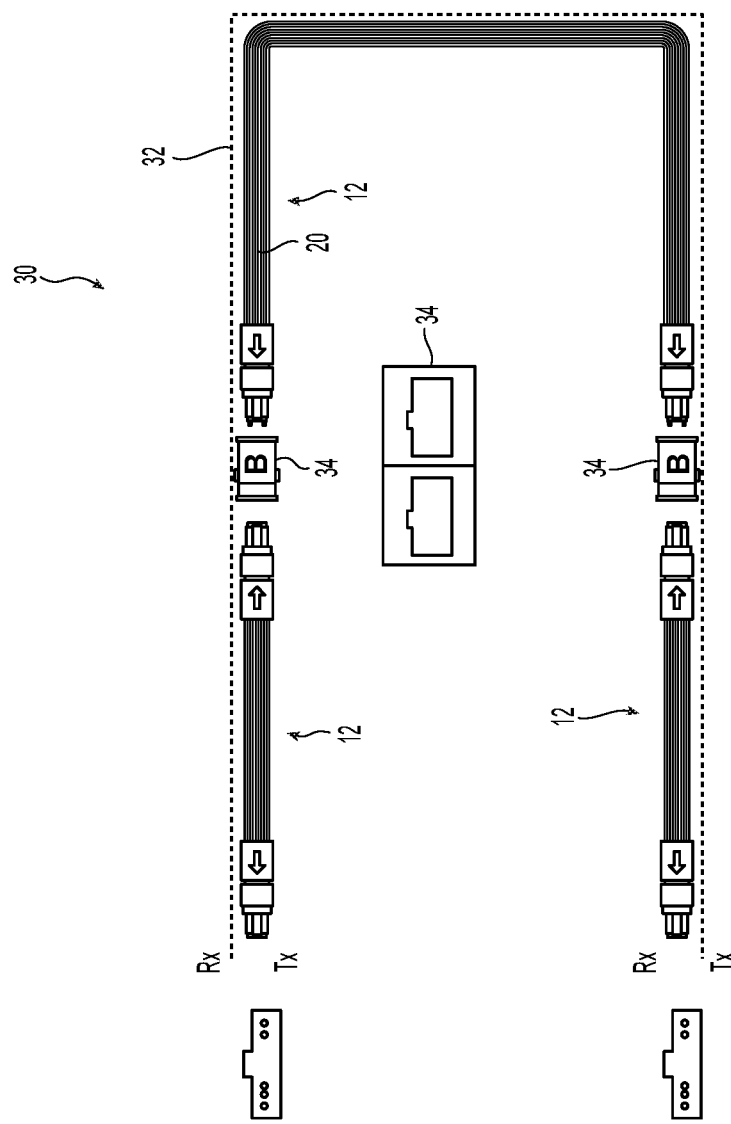
FIG. 4 illustrates a connectivity method for using Type B adapters.
Figure 6:
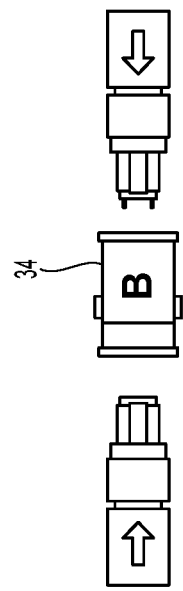
FIG. 6 illustrates the Type B adapters.
Figure 5:
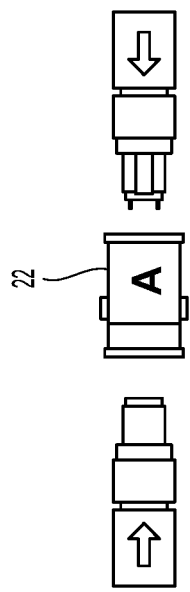
FIG. 5 illustrates the Type A adapters.

FIG. 4 illustrates a system 30 that uses a B-type connectivity system using three Type B fiber optic jumper cables. Again, the following of the optical path 32 shows the required fiber optic jumper cables 12 along with the Type B adapter 34, which mates fiber optic connectors key up to key up. See also FIG. 6. Again, if the polarity could be reversed become a significant advantages would result. Some of the prior art systems allow the removal of a key on one side and insertion on the other side, some use offset keys, and others require that at least a part outfit connect to be disassembled, and some have keys connected to the outer connector housing. All of these present significant disadvantages. Taking a fiber optic connector apart in the field has a risk of losing important parts. Not all systems use or need offset keys. And the removal of parts presents opportunities to damage the fiber optic connector, including the real danger of breaking off parts. Broken parts may not be able to be fixed and a completely new connector may have to be installed, With an increased installation time and costs. The present invention only requires a simple back-and-forth motion of a tool to achieve the desired results with little or no risk of damage or lost parts.

Figure 7:
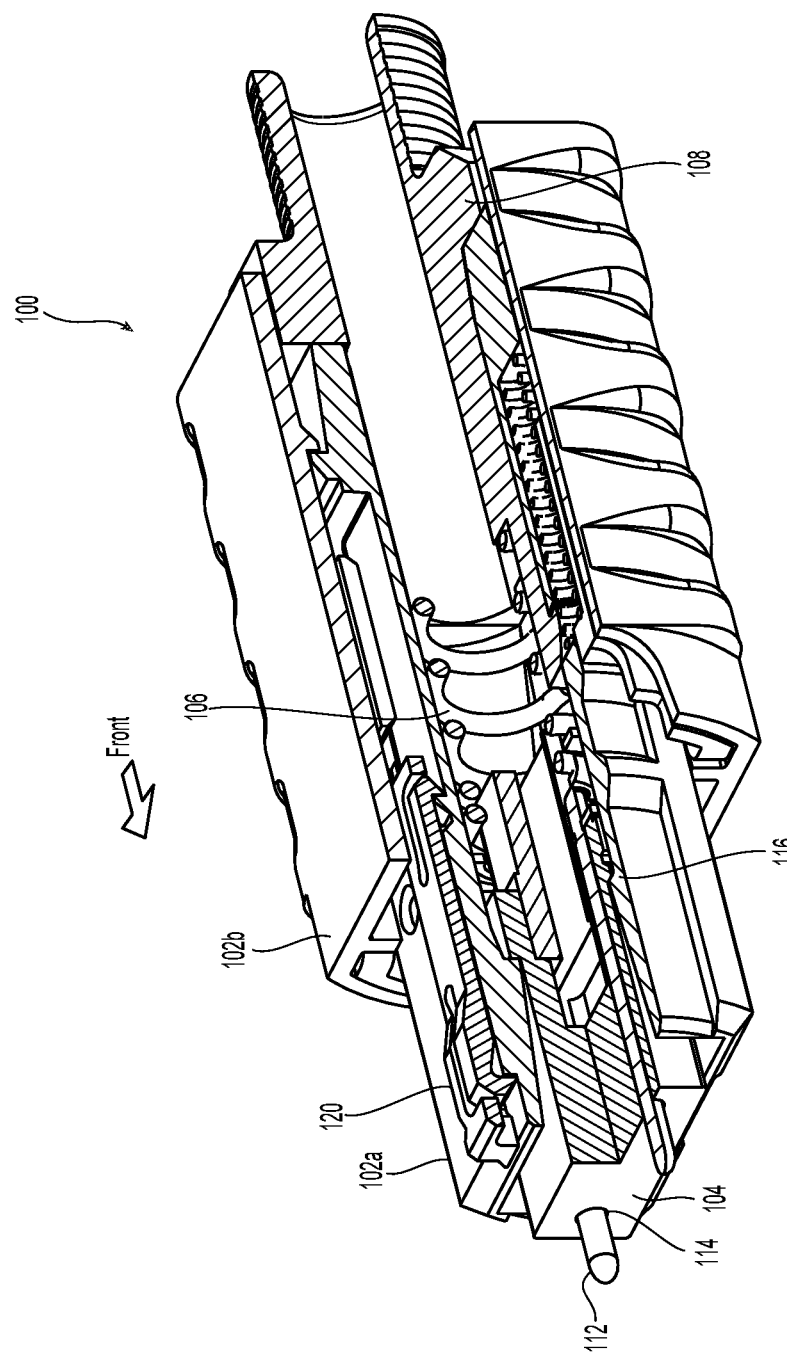
FIG. 7 is a partial cross section view of one embodiment of the fiber optic connector having two keys according to the present invention.

Referring to FIG. 7, a fiber optic connector 100 according to one embodiment of the present invention is illustrated. The fiber optic connector 100 includes a connector inner housing 102a and outer housing 102b, and a fiber optic ferrule 104. It may also include a spring 106, a spring push 108, a guide pin clamp (not shown), and guide pins 112 in guide pin holes 114. As is known in the art, the fiber optic ferrule 104 is inserted into the inner connector housing 102a and it engages a seating surface 116, which prevents the fiber optic ferrule 104 from traveling too far toward the front of the connector housing 102. The spring 106 is inserted behind the guide pin clamp, which is behind the fiber optic ferrule 104 to bias the fiber optic ferrule 104 toward the seating surface 116. A spring push 108 engages the back end of the spring 106 and the connector housing 102, securing the fiber optic ferrule 104, a spring 106, the spring push 108, and the guide pin clamp in the connector housing 102. When the fiber optic connector 100 engages another fiber optic ferrule (not shown), the fiber optic ferrules 104 of the two fiber optic connectors engage one another, causing the spring 106 to be compressed between the guide pin clamp (which engages the rear end of fiber optic ferrule 104) and the spring push 108. The fiber optic ferrule 104 is pushed rearwardly and the fiber optic ferrule 104 is unseated from the seating surface 116. As long as the spring 106 squarely engages the back end 118 of the guide pin clamp, then the fiber optic ferrule 104 can appropriately engage the other fiber optic ferrule.

The fiber optic connector 100 also includes keys 120, one on the top of the fiber optic connector 100 and one (see FIG. 10) on the bottom of the fiber optic connector 100. The keys 120 are the same (except that the keys have different colors in one embodiment to allow the orientation of the fiber optic connector to be more easily identified) for the top and the bottom of the fiber optic connector 100.

The key 120 has a front end 122 and a rear end 124. The front end 122 has a front wall 126 that protects the first latch 128. The front wall 126 also prevents a fiber optic connector from being inserted into an adapter in the wrong orientation. The front end 122 also has a greater height than the rear end 124. Extending through the length of the key 120 is an opening 130 to accommodate surfaces disposed in the recessed portions of the inner connector housing illustrated in FIG. 9. Each of the sides 132 has at the bottom a flared portion 134 that cooperates with the recessed portions of the inner connector housing 102a to create a sliding dovetail. See, e.g., FIG. 7. Alternatively, other configurations for connecting the key 120 to the inner connector housing 102a could be used.

On each of the sides 132 of the key 120 are two notches 136 spaced just behind the front wall 124. The notches 136 cooperate with a tool (see FIGS. 11-13) to allow the key 120 to be pulled from a second position to a first position, as explained more detail below. While the notches 136 are v-shaped, they could be of any appropriate shape that cooperates with the tool and allows sufficient grasping forced to pull the key 120.

In the front end 122 is a tab 140 and in the rear end 124 is a tab 142, the tabs 140, 142 are connected to the key 120 along one side 144, 146. This arrangement allows the tabs 140, 142 to flex both upward and downward, i.e., into the opening 130 and upwards away from the opening 130 for reasons that will be identified below. Attached at the free end of each of the tabs 140, 142 are latches 128, 148, respectively. The latch 128 is a first latch that retains the key 120 in the first position and the second latch 148 retains the key 120 in the fiber optic connector 100 by preventing the key 120 from being removed. As will be made clear below, once the key 120 is disposed within the fiber optic connector 100, it cannot be removed without completely removing the outer housing 102b. Since the outer housing 102b is not intended to be removed once it is installed (and without damaging the fiber optic connector), the keys 120 are permanently installed in the fiber optic connector 100.

Figure 9:
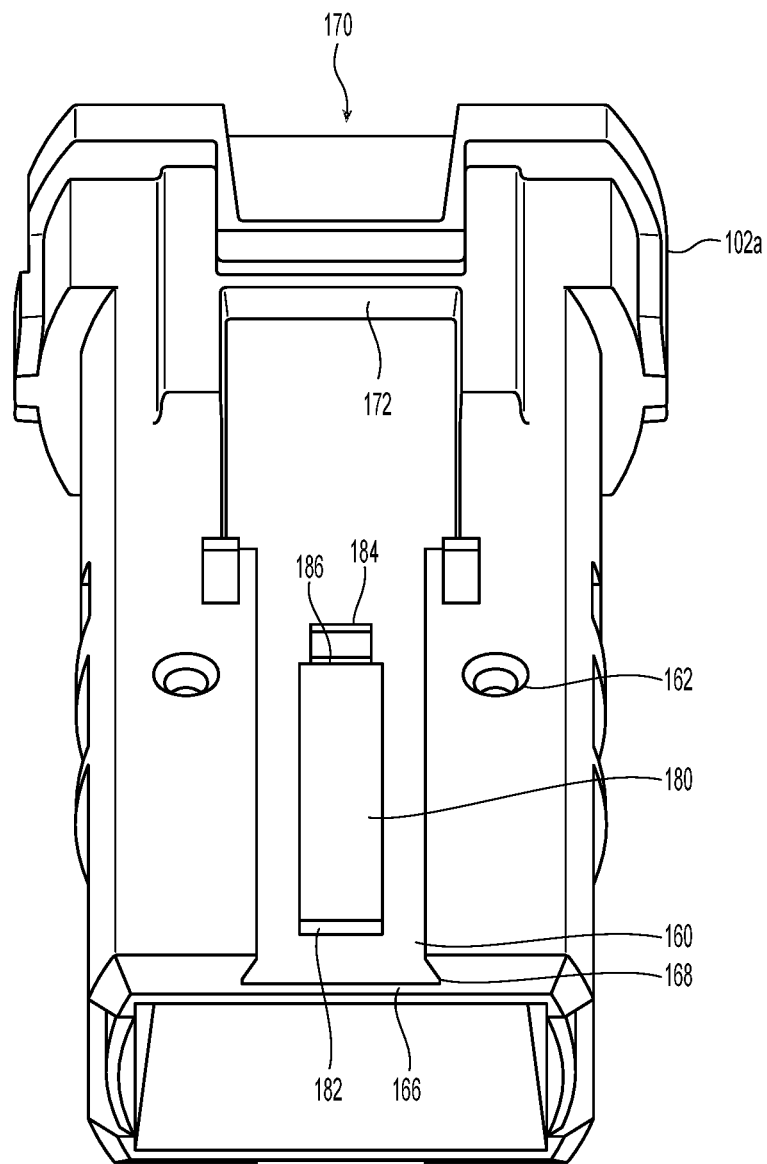
FIG. 9 is a front perspective view of one embodiment of an inner connector housing according to the present invention showing the top of the inner connector housing (the bottom side being the same)

One version of an inner connector housing 102a according to an embodiment of the present invention is illustrated in FIG. 9. The inner connector housing is typical for an MTP connector except for two features. The first are the recessed portions 160 (one on the top and one on the bottom, both being the same) to receive the key 120. The second feature, which is not related to the present application but is different from a standard MTP inner connector housing are the openings 162, which allow for access to a pin keeper that allows the gender of the fiber optic ferrule to be changed. Co-pending application Ser. No. 15/247,839, the contents of which are incorporated herein by reference, describes one such pin keeper and is assigned to the same applicant as the present application. A second application of this applicant, U.S. patent application Ser. No. 15/383,356, filed on Dec. 19, 2016, also discloses a second such pin keeper. The contents of the second application are also incorporated herein by reference.

The recessed portions 160 extend from a front end 164 of the inner connecting housing 102a, without a front barrier to the recessed portions 160. Such a configuration allows for the key 120 to be slid into the recessed portion from in front of the inner connector housing 102a. The recessed portion has a central portion 166 and then an outer flared portion 168 that corresponds to the flared portion 134. The recessed portion runs a substantial portion of the length of the inner connector housing 102*a*—not quite twice the length of the key 120. See, e.g., FIG. 11. At the distal end 170 of the recessed portion 160 is a rear wall 172 to provide a stop for the key 120.

Applicant notes that the term "front" or "forward" means that direction where the fiber optic connector would meet with another fiber-optic connector or device, while the term "rear" or "rearward" is used to mean the direction from which the optical fibers enter into the fiber-optic ferrule or fiber optic connector. Thus, "front" is that part of the inner connector housing 102*a* closest to the legend "FIG. 9" and "forward" is out and downward from the page. See also FIG. 7. "Rear" is that part of the inner connector housing 102*a* that is on the top of the page and "rearward" is up and into the page.

Disposed within the recessed portion 160 is a raised center member 180. The raised center member 180 has a forward facing surface 182 and a rearward facing surface 184. The raised center member 180 is configured to pass through the opening 130 in the key 120. The raised center member 180 and its particular location within the recessed portion 160 is also instrumental in the positioning of the key 120 in the first and second positions. There is also an indentation 186 in the raised center member 180 to receive the first latch 128. The raised center member 180 could also be comprised of multiple smaller sections if so desired. The raised center member 180 provides the forward facing and rearward facing services, which could be done in alternative ways and still fall within the scope of the present invention.

Figure 10:
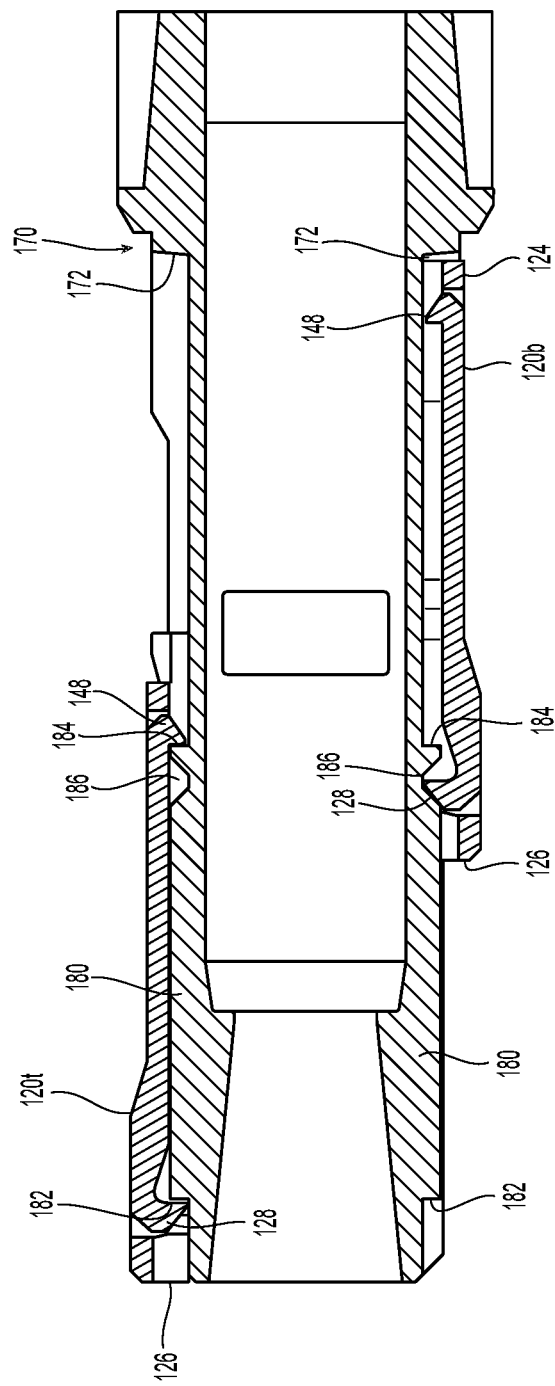
FIG. 10 is a cross sectional view of the inner connector housing of FIG. 9 and two keys according to FIG. 8 in a first position and a second position.

Turning to FIG. 10, a cross sectional view along a longitudinal axis of the inner connector housing 102*a* and two keys 120 are illustrated. The other components of fiber optic connector 100 have been removed from the remaining figures for clarity purposes only. On the top of the inner connector housing 102*a* is a first key 120*t* while a second key 120*b* is disposed on the bottom of connector housing 102*a*. Key 120*t* is in a first position—or the position that will determine the orientation of the fiber optic connector 100. The second key 120*b* is in the second position, or a retracted position that does not affect the orientation of the fiber optic connector 100.

The key 120*t* is slid into the recessed portion 160 so that the flared portion 134 engages the corresponding outer flared portion 168 to keep the key 120*t* within the fiber optic connector 100. The second latch 148, by virtue of latching surface facing forward and also having a chamfered leading edge (as the key 120*t* is pushed onto the inner connector housing 102*a*) and because it is on the flexible tab 142, slides over the raised center portion 180 and past the rearward facing surface 184. The second latch 148 would be hidden from view (and access) by the outer connector housing 102*b*. See FIG. 7. At this point, the key 120*t* is prevented from traveling any farther rearwardly as the front latch 128 engages the forward facing surface 182. With the front latch 128 protected by the front wall 126, it is very difficult, if not impossible, for the front latch 128 to be moved unintentionally and without an appropriate tool to do so. Thus, insertion of a fiber optic connector into an adapter or other device with an incorrect orientation would be impossible with the key 120*t* in place as illustrated in FIG. 10. The key 120*t* also cannot be pulled out of the inner connector housing 102*a* because the second latch 148 engages the rearward facing surface 184.

In viewing FIG. 10, the inner housing could be rotated 180 degrees so that the top is the bottom and the bottom is the top, but for the purposes of the discussion herein, the features remain the same regardless of the orientation.

Key 120*b* is in the second position on the bottom of the inner connector housing 102*a*. Key 120*b* would preferably be placed in the second position before the fiber optic connector is assembled. However, it is possible, as discussed below with regard to the changing of polarity, to add both keys after the inner and outer connector housings are in place.

Key 120*b* has the first latch 128 in the indentation 186 in the raised center member 180 and the rear end 124 engaging the rear wall 172 at distal end 170. With the first latch 128 in the indentation 186, the key 120*b* will not be able to move within the fiber optic connector 100, without using a tool to move it.

Figure 11:
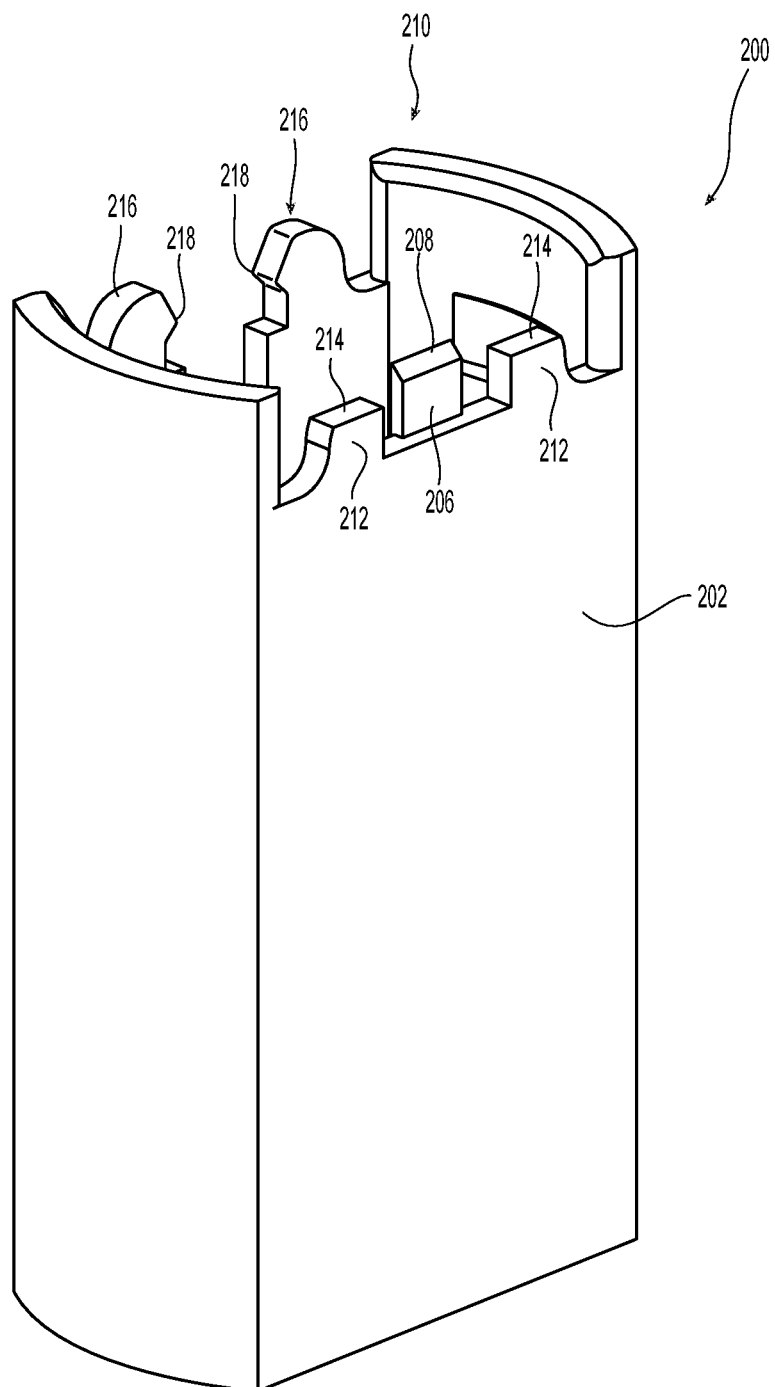
FIG. 11 is a perspective view of one embodiment of a tool to be used with the fiber optic connector of FIG. 7.
Figure 12:
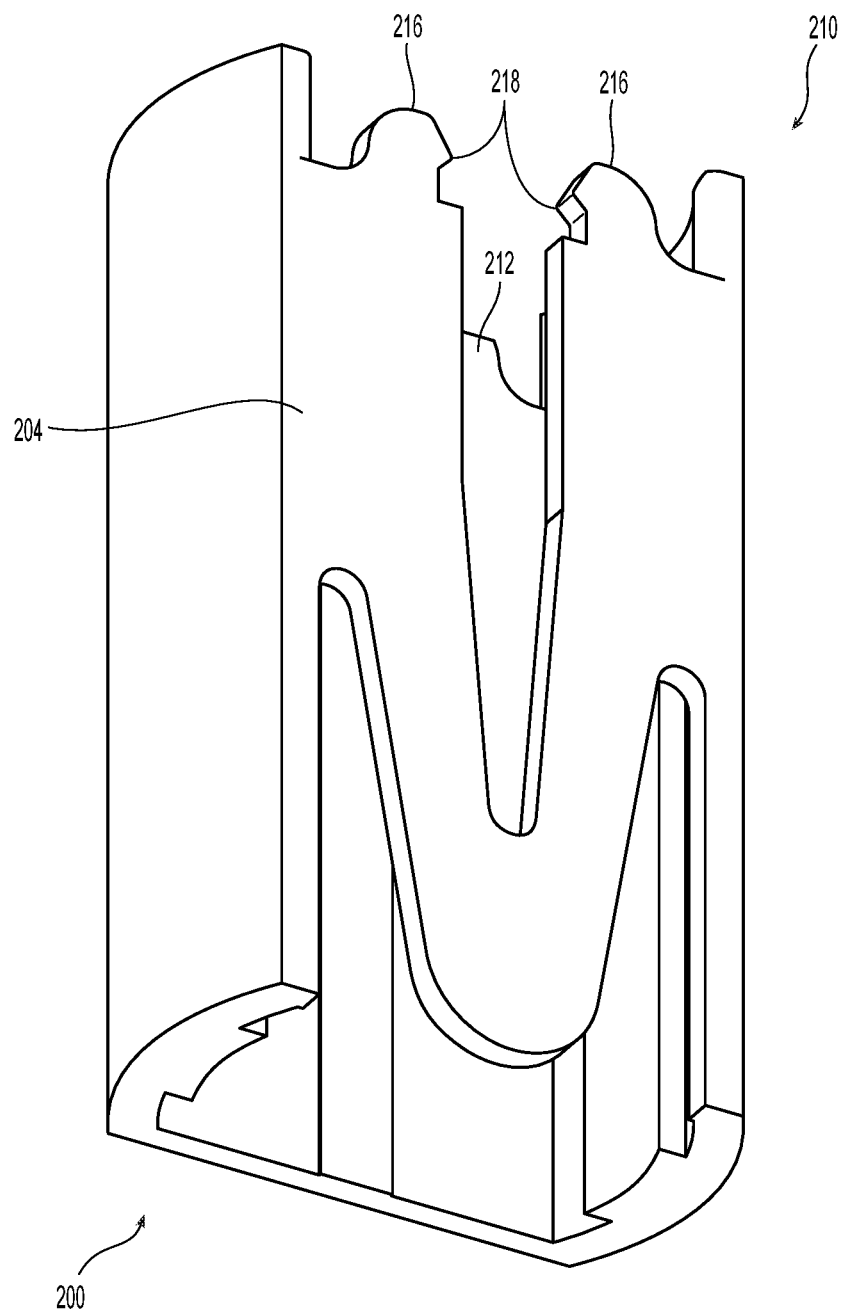
FIG. 12 is a perspective view of the tool in FIG. 11 from the opposite side.
Figure 13:
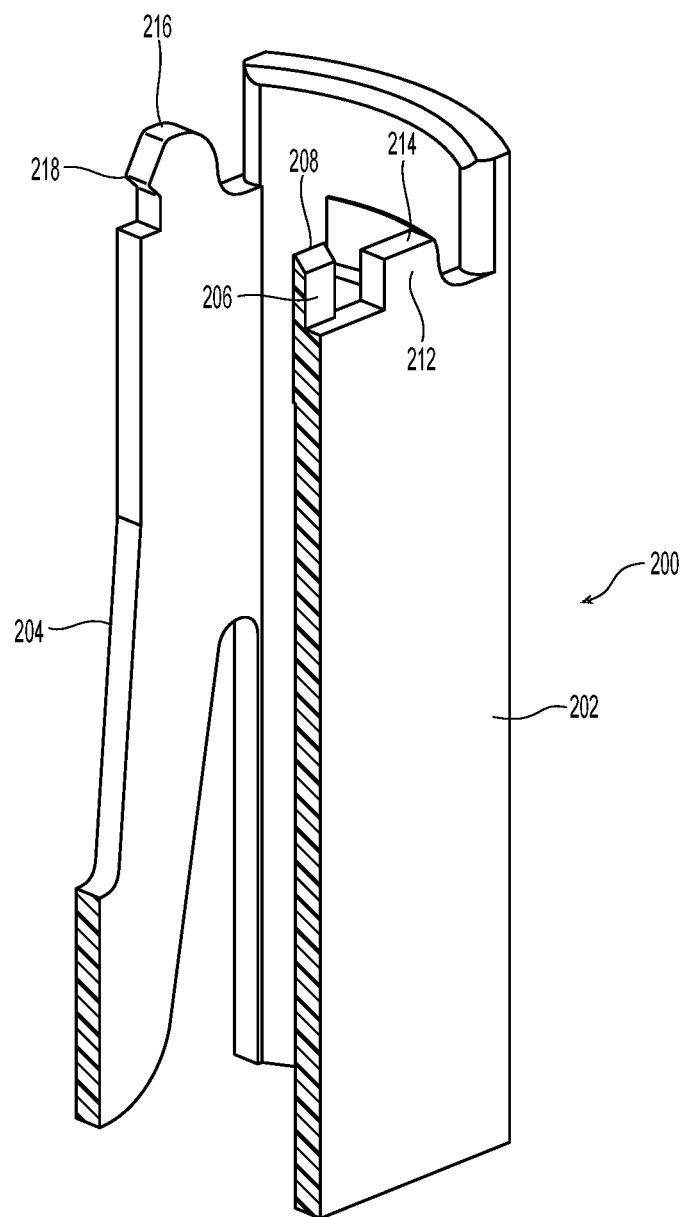
FIG. 13 is a cross section along a longitudinal axis of the tool in FIG. 11.

The tool 200 that is used to move one of the keys 120 rearward and one forward in a single action is illustrated in FIGS. 11-13. The tool 200 has a first side 202 that is aligned with the key 120 disposed in the first position. Thus, the second side 204 of tool 200 is aligned with the side of the fiber optic connector 100 with the key 120 in the second position. If the tool 200 is aligned incorrectly (second side 204 aligned with the key 120 in the first position), the tool 200 will not be able to move the key 120 as the latch 128 will prevent the key 120 from moving, thereby signaling to the user that the tool 200 needs to be reoriented with respect to the fiber optic connector 100.

Figure 14:
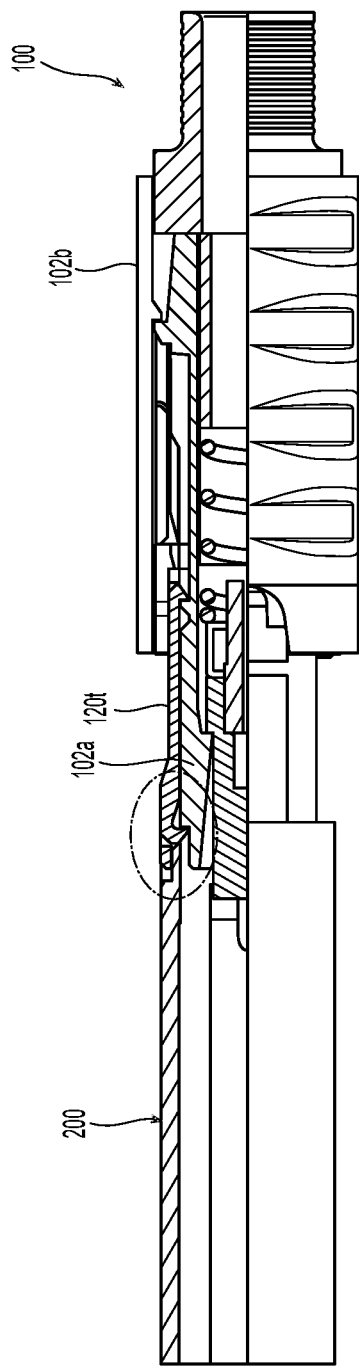
FIG. 14 is a partial cross section of the fiber optic connector with the tool in a starting position on the fiber optic connector.
Figure 15:
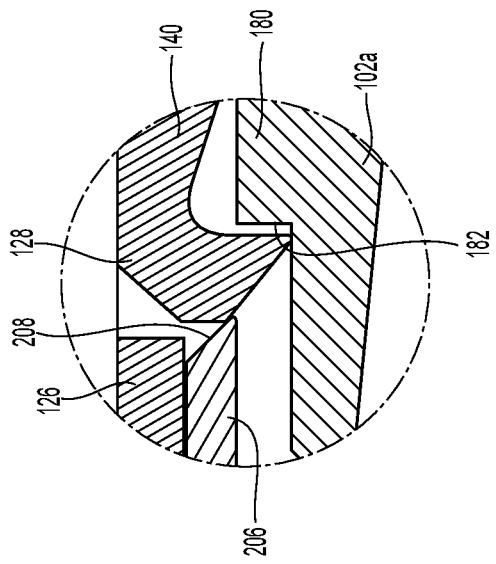
FIG. 15 is a detail view of the chamfered leading edge of the tool of FIGS. 11-13 engaging one key to reverse polarity of the fiber optic connector.
Figure 16:
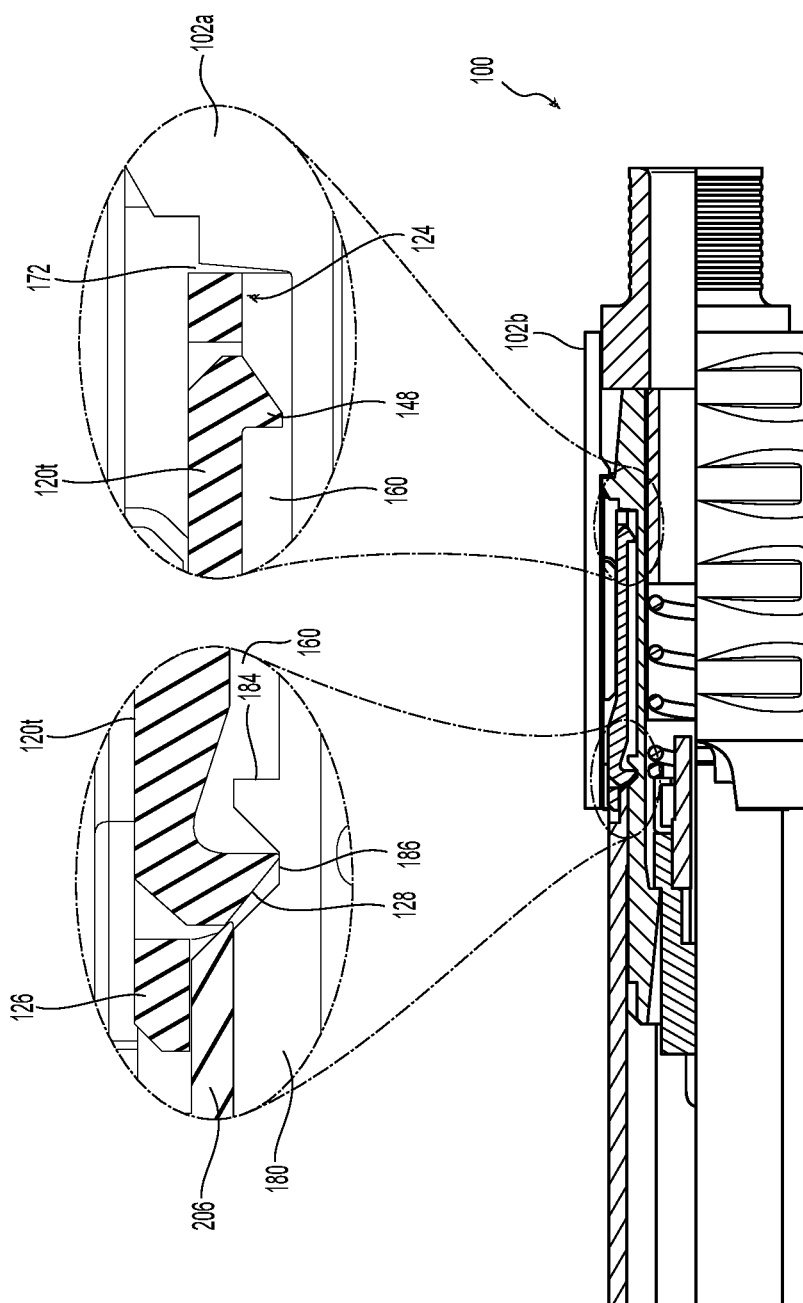
FIG. 16 is a partial cross section of the fiber optic connector with two detail drawings showing the first key in the second position with a first latch in the indentation and the rearward end of the key against the key stop.

The first side 202 of the tool 200 has a leading prong 206 with a chamfered edge 208 at a first end 210. On either side of the leading prong are two side extensions 212, preferably with flat leading edges 214, that engage the front wall 126 of the key 120. Referring to FIGS. 14 and 15, the tool 200 is inserted around the inner connecting housing 102*a* and the chamfered edge 208 of the leading prong 206 engages the first latch 128. See FIG. 15. This causes the first latch 128 to be lifted up and clear the forward facing surface 182. Then as the tool 200 is inserted farther, the two side extensions 212 engage the front wall 126 and the key 120*t* is pushed rearwardly toward the rear wall 172. Once the rear end 124 engages the rear wall 172, the tool 200 can not be pushed any farther into the fiber optic connector 100. This position is illustrated in FIG. 16. In the top left detail of FIG. 16, the first latch 128 is disposed in the indentation 186, while in the top right detail of FIG. 16 the rear end 124 is disposed against the rear wall 172. At this point, it should be noted that both keys 120*t* and 120*b* are in the second position. However, the tool 200 is disposed as far into the fiber optic connector 100 as possible. The top key 120*t* will remain in this second position when the tool 200 is extracted. Nothing on the tool 200 engages the top key 120*t* such that pulling the tool 200 out will cause the top key 120*t* to come with it. Moreover, the first latch 128 is disposed within the indentation 186 which supplies resistance to removal of the top key 120*t*.

Returning to the installation of the keys 120 after the inner and outer connector housings 102*a*,102*b* have been installed, one key 120*b* (again, the bottom reference merely indicates that the key will in this explanation will be in the second position), will be inserted into the recessed portion 160 as noted above. It can be pushed back into the inner connector housing 102*a*, with or without the aid of the tool 200, until the first latch 128 engages the forward facing surface 182. The tool 200 then will be used as noted above to push the key 120*b* deeper into the recessed portion 160—until it engages the rear wall 172. Without a key 120 on the other side of the fiber optic connector 100, the tool 200 will simply slide out, leaving the key 120*b* in the second position. A second key 120*t* (again because it will be in the first position) would be inserted into the opposite side of the fiber optic connector 100 with or without the use of the tool 200 until the first latch 128 engages the forward facing surface 182. Now there are two keys 120 installed in the fiber optic connector 100. Alternatively, the keys 120 may also be installed from the back side of the inner connector housing 102*a* before outer connector housing 102*b* is installed.

Figure 17:
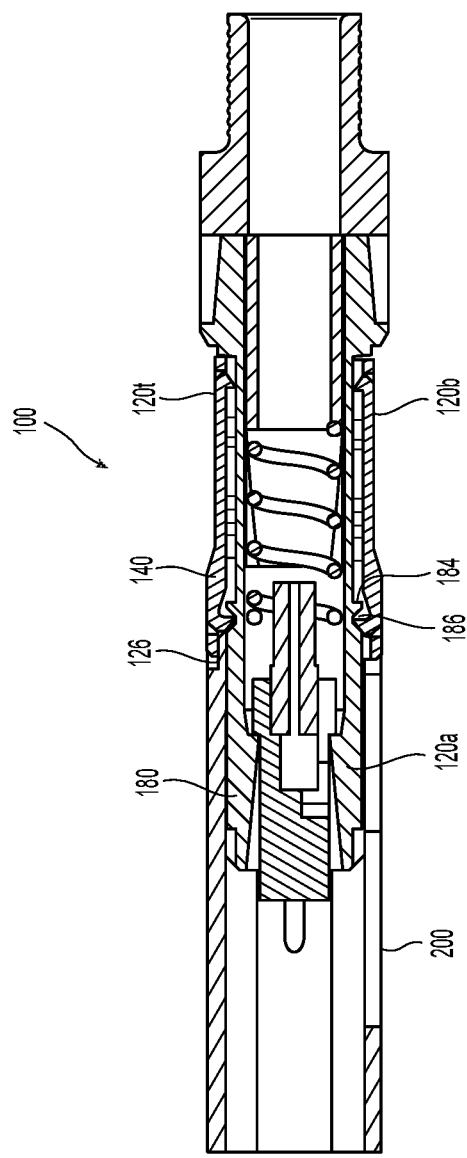
FIG. 17 is a cross section of the fiber optic connector with the tool engaging the second of the two keys to pull the second key forward.
Figure 18:
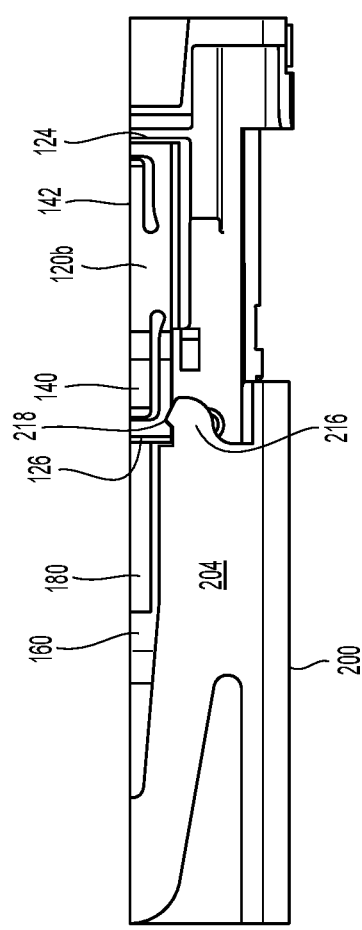
FIG. 18 is a partial underside view of the protrusions of the tool engaging the second key as illustrated in FIG. 17.
Figure 19:
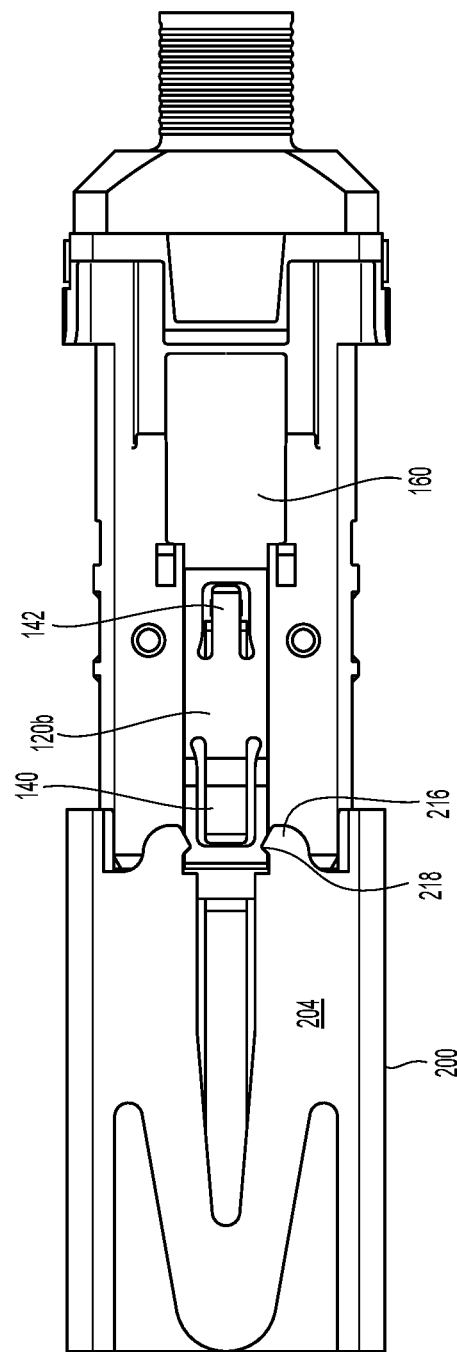
FIG. 19 is an underside view of the tool, key and inner connector housing showing the second key in the first position after the tool is pulled forward.
Figure 20:
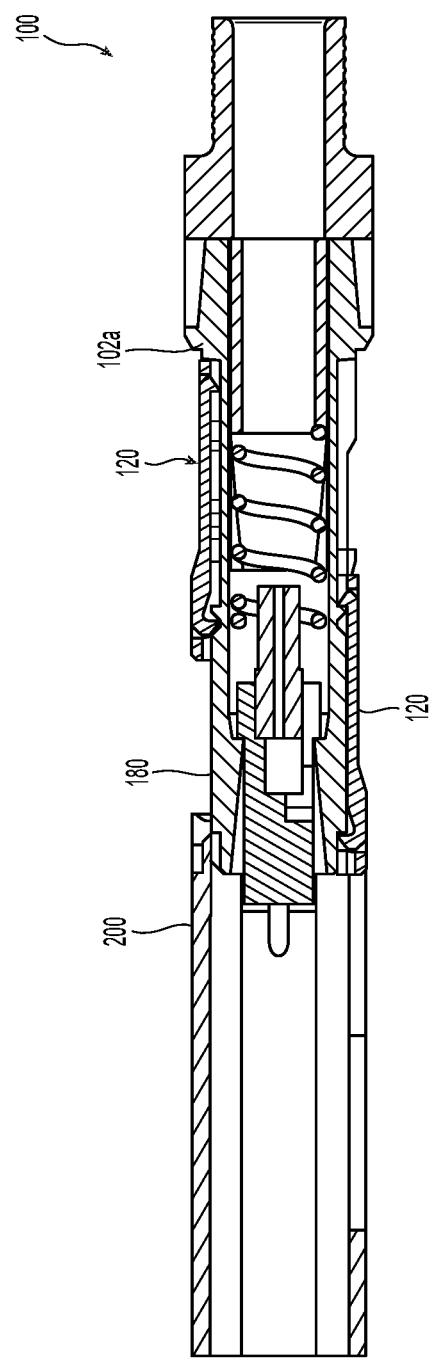
FIG. 20 is a cross section view of the fiber optic connector illustrating the first key in the second position and the second key in the first position as also illustrated in FIG. 19, thus reversing the polarity of the fiber optic connector.

Returning to FIGS. 11-13, these figures are used to describe the second side 204 of the tool and moving the key 120*b* from the second position to the first position. The second side 204 of the tool 200 has two tabs 216 at the first end 210. Each of the tabs 216 has a protrusion 218 on an inside portion of the tabs 216 and therefore the protrusions 218 face each other. The protrusions 218 have a v-shape that correspond to the notches 136 on the front end 122 of the keys 120. It is the engagement of the protrusions 218 with the notches 136 that allows the tool 200 to move the key 120*b* from the second position to the first position. This will be explained with reference to FIGS. 17 and 18. In FIG. 17, the tool 200 is inserted as far as possible after moving key 120*t* from the first position to the second position. At this location, the tabs 216 have passed by the front end 122 of the key 120*b* and the protrusions 218 have engaged the notches 136. See FIG. 18, which shows one side of the tool 200 engaging the key 120*b* and, in particular, the tab 216 and protrusion 218 in the notch 136. The force of the tool 200 on the front end 122 of the key 120*b* in the notches 136 is greater than the force required to move the first latch 128 out of the indentation 186 in the recessed portion 160. As the tool 200 is pulled out of the fiber optic connector 100, the key 120*b* is moved with the tool 200. See FIG. 19. The second latch 148 will then engage the rearward facing surface 184, preventing any further forward movement of the key 120*b*. As the tool is continued to be pulled, the tabs 216 will flex open allowing the key 120*b* to be freed from the tool 200. At this point, the first latch 128 will be in front of the forward facing surface 182 and the key 120*b* is now in the first position. As noted above, the key 120*t* is left in the second position and the two keys 120 have been reversed in position within the fiber optic connector 100. See FIG. 20.

Figure 8:
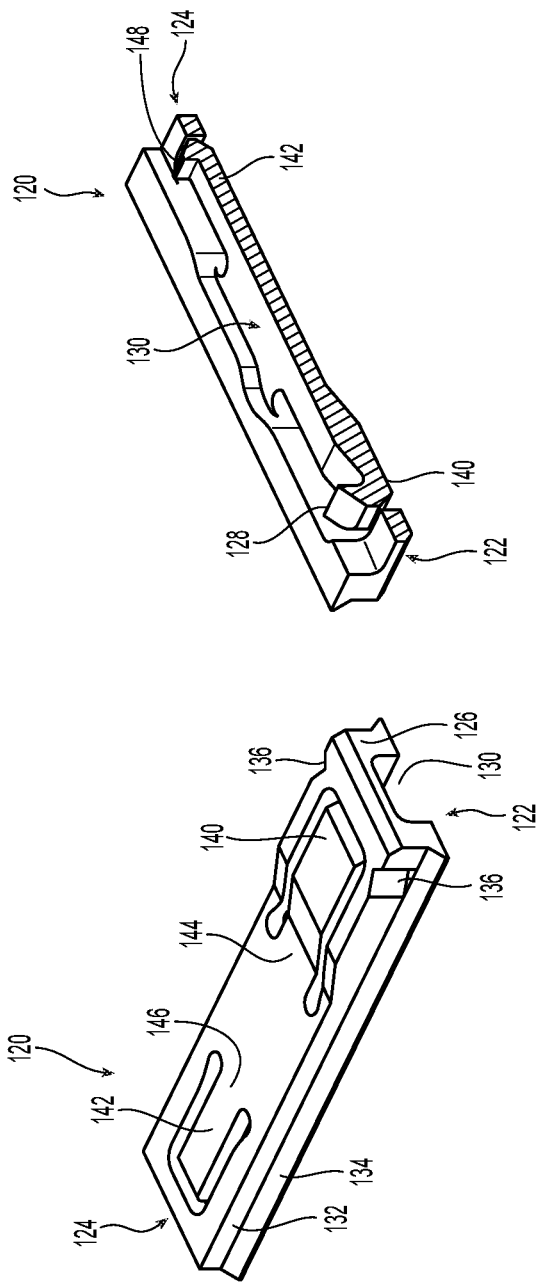
FIG. 8 is a perspective view of one embodiment of a key according to the present invention and a cross section of that key.
Figure 21:
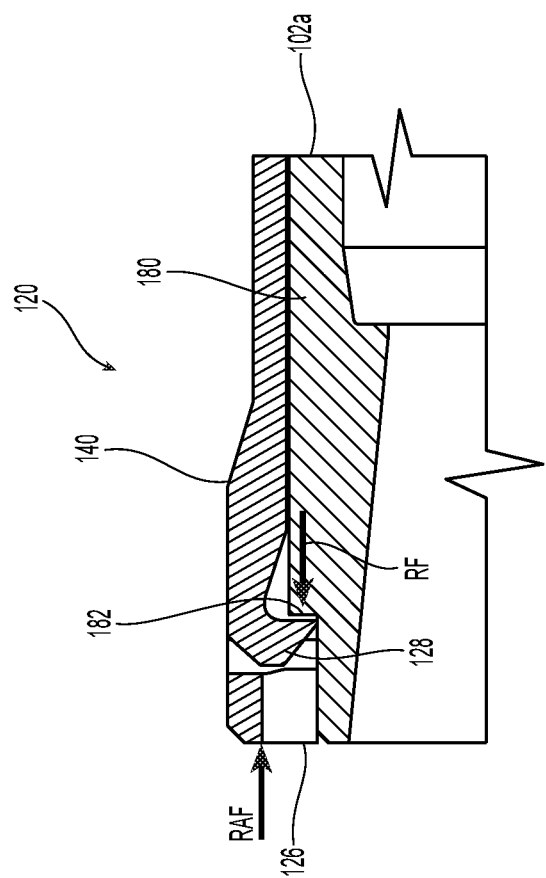
FIG. 21 is an enlarged, partial cross-section view of one of the keys in FIGS. 8 and 10.
Figure 22:
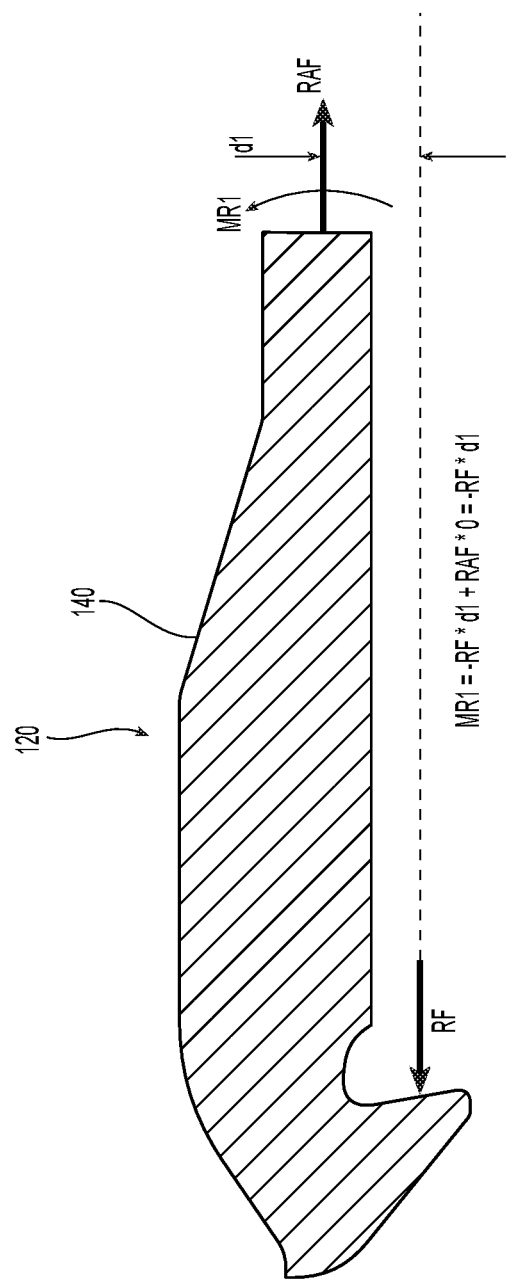
FIG. 22 illustrates the forces on the key illustrated in FIG. 21 when the key engages a fiber-optic connector adapter in an incorrect orientation.

In the key 120 illustrated in FIG. 8 and as noted above, the front latch 128 engages the forward facing surface 182 of the inner connector housing 102*a* and prevents the key 120 from moving relative to the inner connector housing 102*a* and also prevents the fiber optic connector 100 from being inserted in an incorrect orientation. As illustrated in FIG. 21, a rearward applied force RAF (when inserted incorrectly) on the front wall 126 of the key 120 requires that the forward facing surface 182 apply a reaction force RF to be equal and opposite to that rearward applied force RAF. These forces are more fully illustrated in FIG. 22. Based upon the design of the key 120 the location of the rearward applied force RAF on the key 120 and the reaction force RF, there is a tensile load and a bending load in front latch 128.

Figure 23:
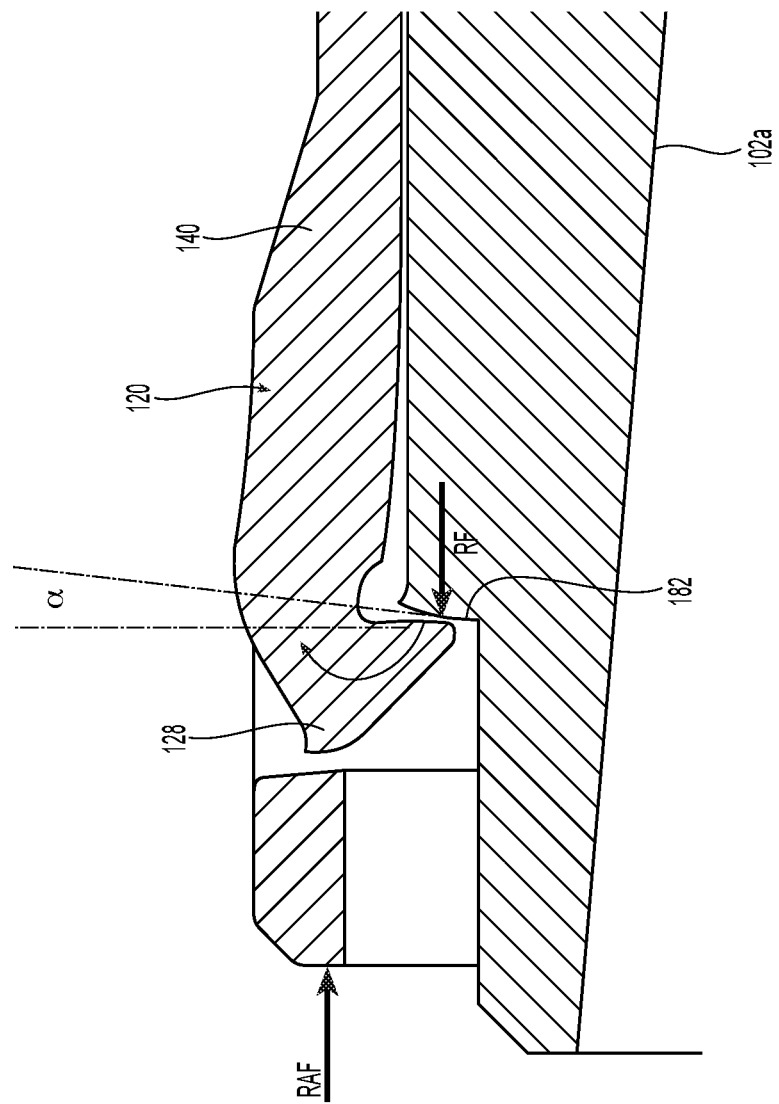
FIG. 23 illustrates the stresses, compression and deformation the latch and inner connector housing in FIG. 22 experience when the key is subjected to a rearward directed force.

FIG. 23 illustrates the effect of the tensile load and bending load on the latch 120. The tab 140 that carries the front latch 128 will start to lift relative to the inner connector housing 102*a* as the loads increase. As illustrated, the front latch 128 will rotate in a counterclockwise direction, changing the latch angle by an angle α. There may also be deformation of the forward facing surface 182 of the inner connector housing 102*a*. As the forces increase, the key 120 will eventually fail for one of two reasons, allowing the key 120 to be pushed in a rearward direction and not provide the keying function. The first of these two failures is when the latch angle exceeds $\alpha=\tan^{-1}(1/\mu)$ (where μ is the coefficient of friction) allowing the front latch 128 to release from the forward facing surface 182 of the inner connector housing 102*a*.

The second of these failures comes when the stress (or compression or deformation) exceeds the material strength, resulting in the breaking of the latch (and or the surface 182), again allowing the key 120 to move in a rearward direction.

Another embodiment of a key 300 according to the present invention is illustrated in FIGS. 24-26. The key 300 has a main body 302 that extends from a front end 304 to a rear end 306. At the front end 304 has a cantilevered portion 308 that extends from a central portion 310 of the main body 302 towards the front end 304. The cantilevered portion 308 may diverge into two arms 312, 314, although it may be a singularity.

The key 300 also has first portion 316 and second portion 318 that extend from the central portion 310 of the main body 302 along opposite sides of the cantilevered portion 308. The first and second side portions 316,318 each have a flared portion 320 along opposing edges 322,324 to engage the inner connector housing 102*a* and to create a sliding dovetail. See FIG. 9 and corresponding text. Extending along the length of the underside of the main body 302 is an opening 330 to accommodate surfaces and features disposed in the recessed portions of the inner connector housing, such as those illustrated in FIG. 9. The main body 302 has a rear surface 332 that faces to the front end 304 of the key 300 that may provide a stop surface and prevent the key 300 from being pulled from the fiber optic connector 100. There may be surfaces, such as the rearward facing surface 184, in the inner connector housing 102*a* that are used to limit the movement of the key 300. On the opposite side of rear surface 332 is another rearward facing surface 334 that may engage a rear wall 172 of the inner connector housing 102*a* to prevent the key 300 from being pushed too far into the inner connector housing 102*a*.

Figure 27:
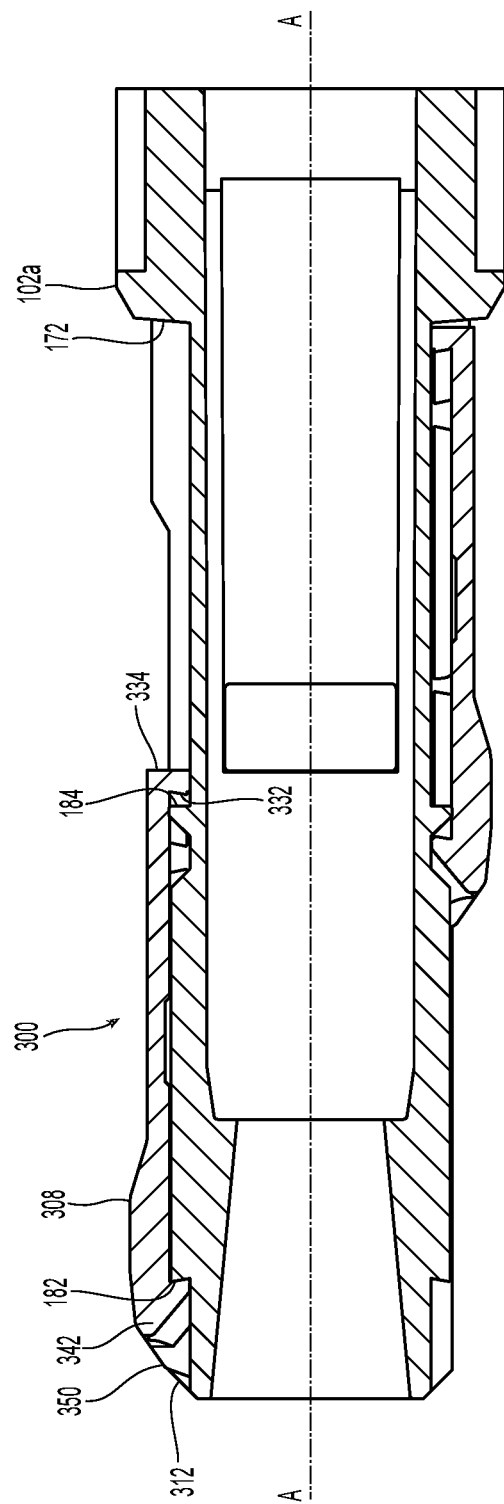
FIG. 27 is a cross-section view of an inner connector housing and two keys from FIG. 24.
Figure 28:
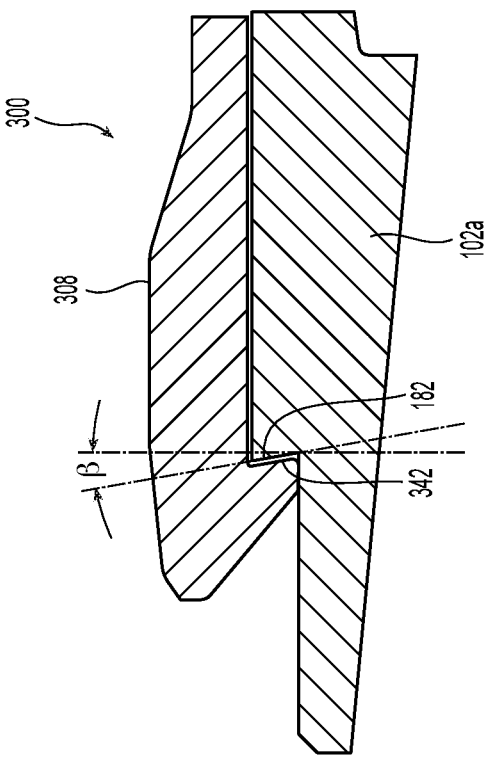
FIG. 28 is an enlarged portion of the inner connector housing and key in FIG. 27.
Figure 29:
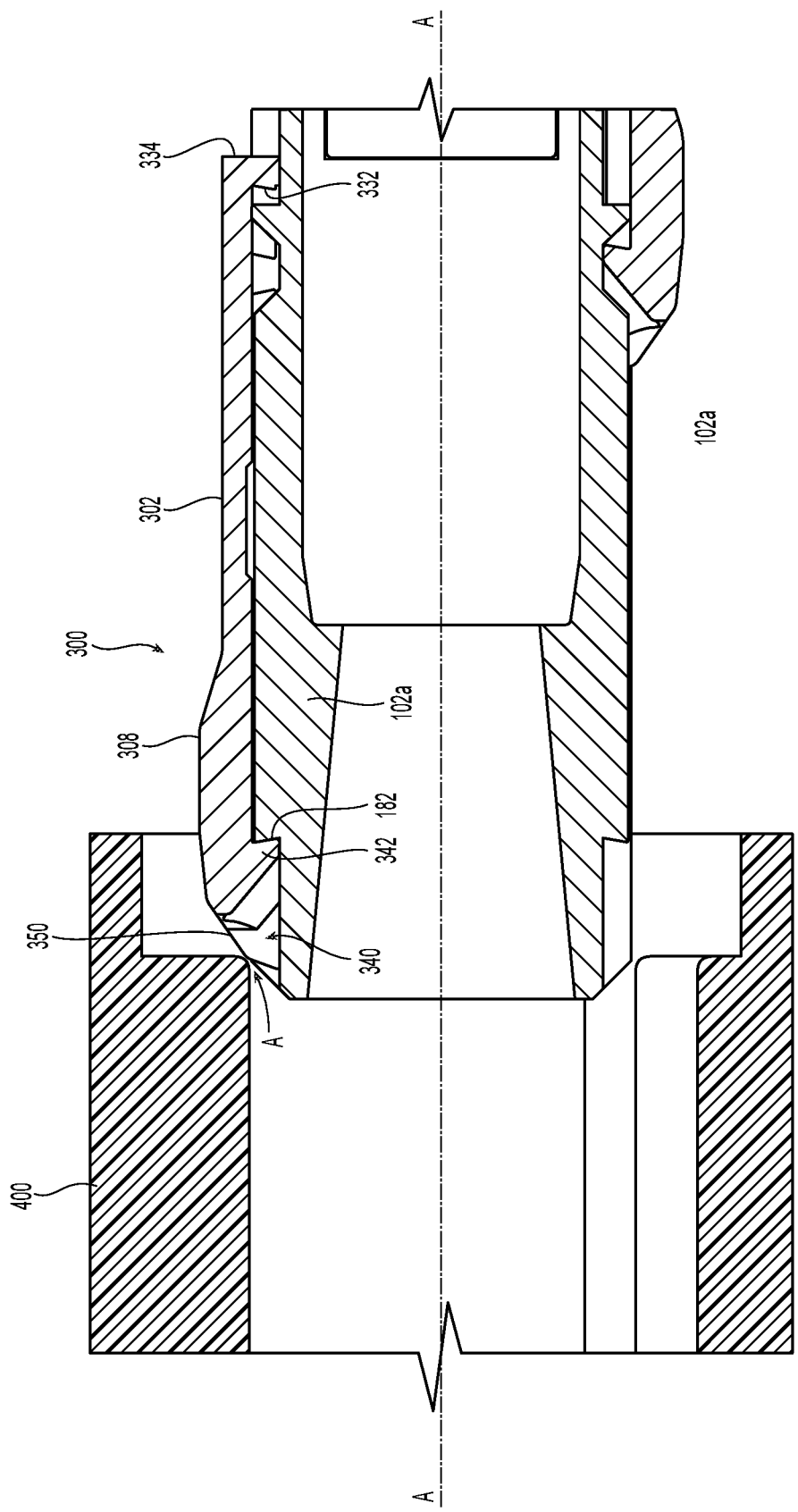
FIG. 29 is an enlarged portion of the fiber optic connector and key in FIG. 24.

In the central area 340 between the two arms 312, 314 of the cantilevered portion 308 and extending into the opening 330 is a latch 342. See FIG. 25. The latch 342 corresponds to and performs similar functions as the latch 120. Turning to FIGS. 27-29, the latch 342 engages a forward facing surface 182 to prevent the key from being pushed rearwardly. It should be noted that the forward facing surface 182 and the latch 342 may not be perpendicular to the longitudinal axis A through the inner connector housing 102*a*. In this case, the forward facing surface 182 and the latch 342 are disposed at an angle of β. See FIG. 28. The values for the angle of β may range from +10° to −10° off the vertical in FIG. 28. This assists in maintaining contact between the forward facing surface 182 and the latch 342, thereby preventing slippage of those surfaces and the rotation of the latch 342 when under stress/compression.

The key 300 also has different heights or thicknesses at the different ends thereof. As with the prior embodiment, the front end 304 has a greater height than the rear end 306. When oriented correctly, the key 300 will pass into the adapter 400 without issue. If oriented incorrectly, the larger front end 304 of the key, and the cantilevered portion 308 in particular, will hit the adapter 400 with the adapter engagement surface 350 at point A thereby preventing the fiber optic connector from being inserted into the adapter 400. Prior to contact with point A, as the fiber optic connector 100 is entering the adapter 400, the cantilevered portion 308 is in a relaxed first state. Subsequently, upon contact with point A, the cantilevered portion 308 encounters aforementioned forces that cause the cantilevered portion 308 to be in a compressed second state. In this compressed state, the cantilevered portion 308 is pushed against the forward facing surface 182, and is prevented from moving further rearward, thereby preventing incorrect polarity insertion of the fiber optic connector 100 into the adapter 400.

Figure 30:
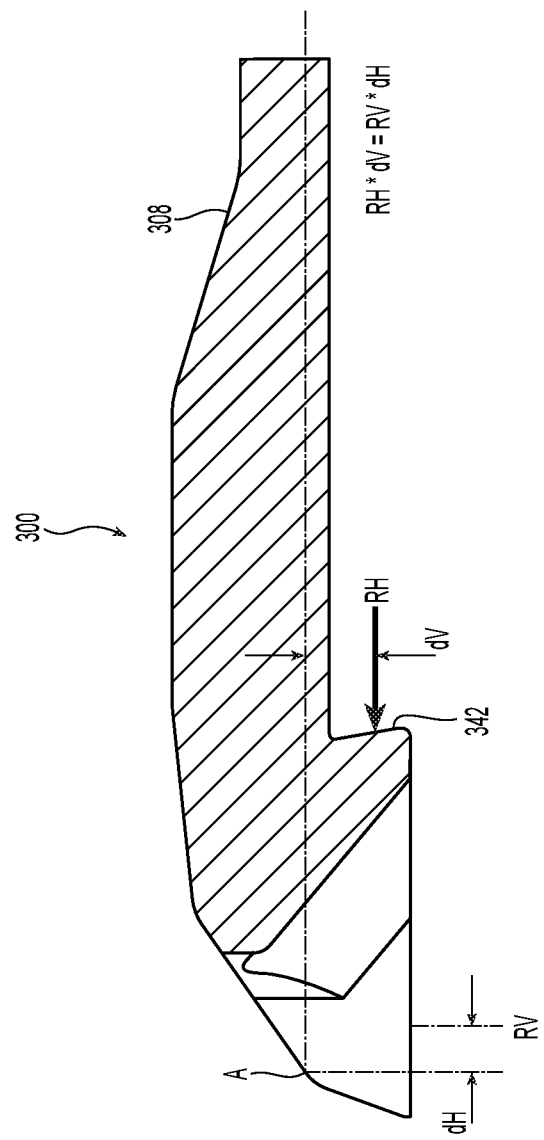
FIG. 30 illustrates the stresses, compression and deformation the latch in FIG. 24 experiences when the key is subjected to a rearward directed force.

The adapter engagement surface 350 of the cantilevered portion 308 has a forward facing surface. As can be particularly seen in FIGS. 24 and 26, the adapter engagement surface 350 may have two different portions that are disposed at different angles relative to the longitudinal axis A. The bottom portion of the adapter engagement surface 350 is more vertical and then transitions into a more horizontal surface. The adapter engagement surface 350 is designed to engage the adapter 400 if the fiber optic connector is not correctly oriented. See FIG. 29. It is at this position that the adapter 400 will engage the key 300. See FIGS. 29 and 30. When the adapter 400 makes contact with the adapter engagement surface 350 as illustrated, the forces and the moments in the latch 342 are balanced, and the latch is more secure than that of the prior embodiment.

On the outsides of each of the arms 312, 314 of the cantilevered portion 308 are two notches 360 spaced just behind the front end 304. The notches 360 cooperate with the tool (see FIGS. 11-13), or a similar tool, to allow the key 300 to be pulled from the second position to the first position as explained above. The notches 360 are v-shaped, but they could be of any appropriate shape that cooperates with the tool and allows sufficient grasping forced to pull the key 300.

Figure 33:
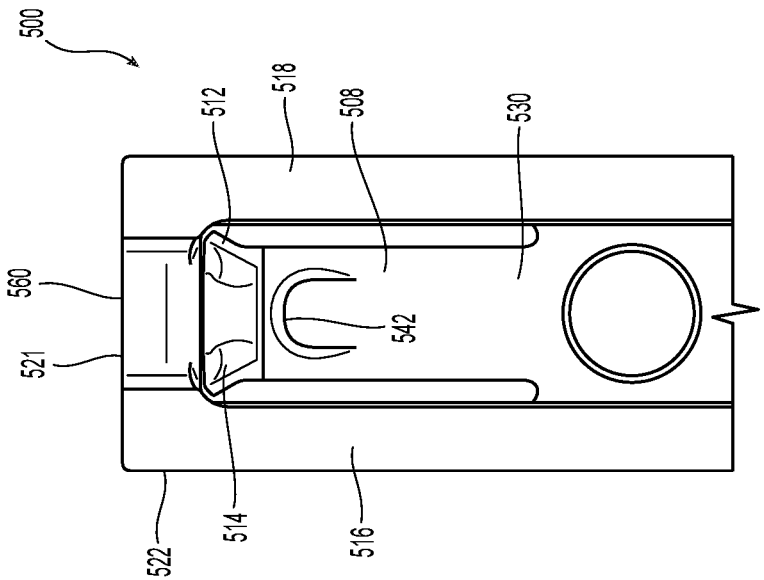
FIG. 33 is bottom elevation view of the key in FIG. 31.
Figure 31:
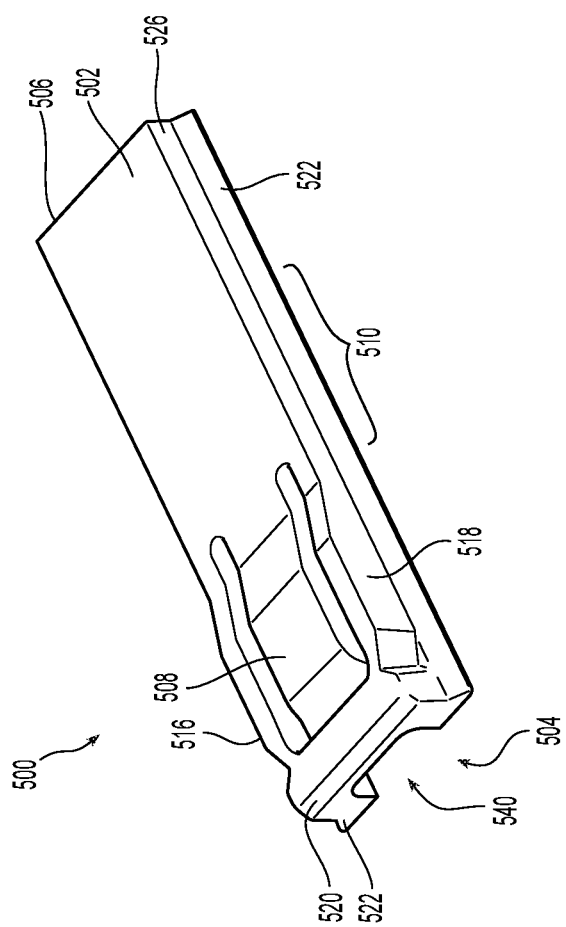
FIG. 31 is a perspective view of another embodiment of a key to be disposed in a portion of a fiber optic connector housing according to the present invention.
Figure 32:
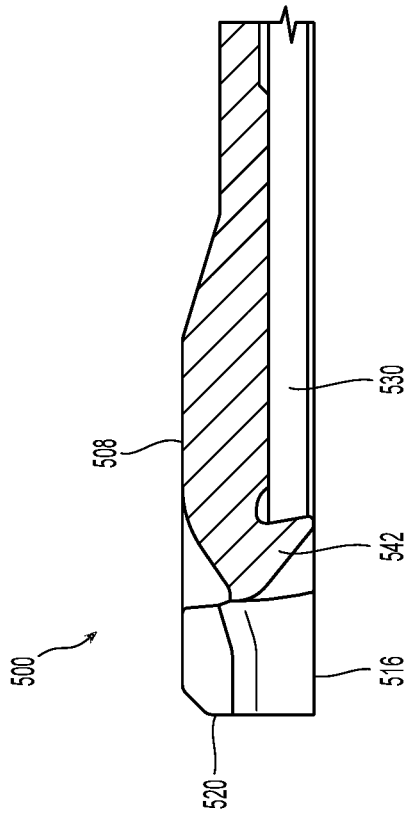
FIG. 32 is a cross section of a portion of the key in FIG. 31 illustrating a front wall engaging a portion of the key when a rearward directed force is applied thereto.

Another embodiment of a key 500 according to the present invention is illustrated in FIGS. 31-33. The key 500 has a main body 502 that extends from a front end 504 to a rear end 506. At the front end 504 has a cantilevered portion 508 that extends from a central portion 510 of the main body 502 towards the front end 504. At the front end of the cantilevered portion 508 are two flared or knuckle portions 512,514 that extend outward from the cantilevered portion 508.

The key 500 also has first portion 516 and second portion 518 that extend from the central portion 510 of the main body 502 along opposite sides of the cantilevered portion 508 and end at a front wall 520. The first and second side portions 516,518 each have a flared portion 522 along opposing edges 524,526 to engage the inner connector housing 102*a* and to create a sliding dovetail. See FIG. 9 and corresponding text. Extending along the length of the underside of the main body 502 is an opening 530 to accommodate surfaces and features disposed in the recessed portions of the inner connector housing 102*a*, such as those illustrated in FIG. 29. The main body 502 has a rear surface 532 that faces to the front end 504 of the key 500 to provide a stop surface and prevent the key 500 from being pulled from the fiber optic connector 100. There may be surfaces, such as the rearward facing surface 184, in the inner connector housing 102*a* that are used to limit the movement of the key 500. On the opposite side of rear surface 532 is another rearward facing surface 534 that may engage a rear wall 172 to prevent the key 500 from being pushed too far into the inner connector housing.

In the central area 540 of the cantilevered portion 508 and extending into the opening 530 is a latch 542. The latch 542 corresponds to and performs similar functions as the latches 342 and 120.

In this embodiment, if the key 500 engages the adapter, the front wall 520 is the structure on the key 500 that will engage the adapter. As is clear from FIG. 32, a central part 560 of the front wall 520 will move over the front of the cantilevered portion 508, thereby preventing the latch to move upward and away from the forward facing surface 182. The side portions of the front wall 520 will also move rearwardly to engage the two flared or knuckle portions 512,514, also preventing the cantilevered portion 508 and the latch 542 from moving upward and away from the forward facing surface 182.

Figure 36:
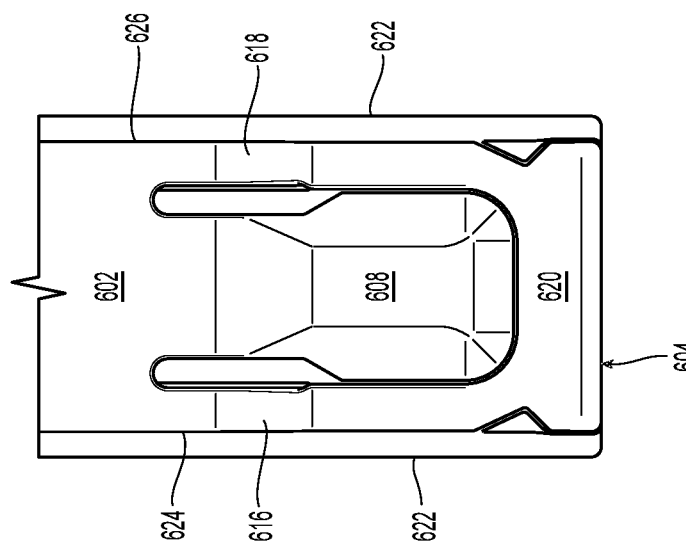
FIG. 36 is top elevation view of a portion of the key in FIG. 34.
Figure 34:
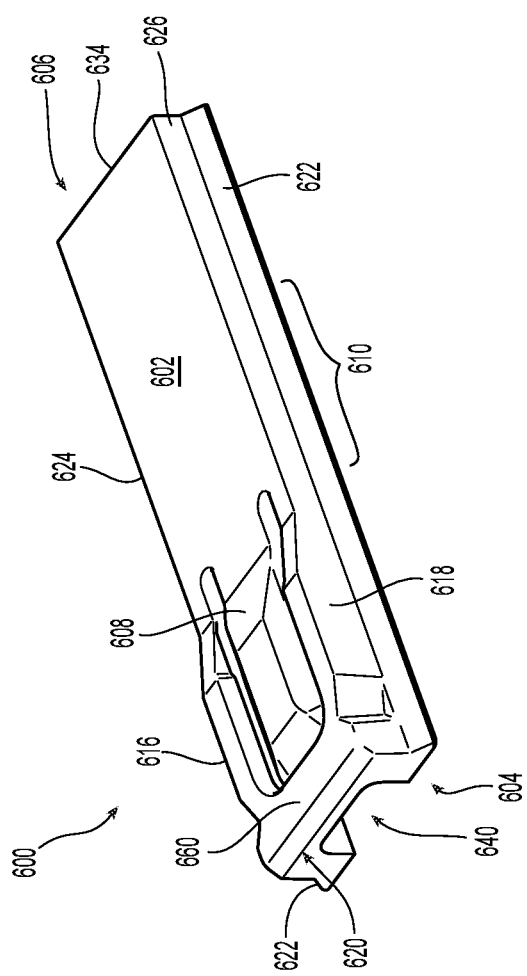
FIG. 34 is a perspective view of another embodiment of a key to be disposed in a portion of a fiber optic connector housing according to the present invention.
Figure 35:
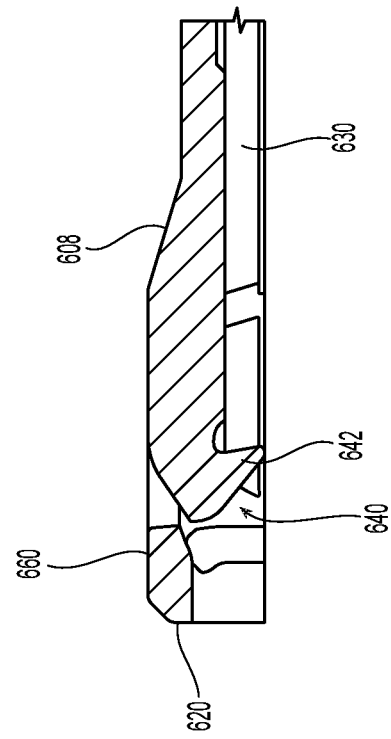
FIG. 35 is a cross section of a portion of the key in FIG. 4 illustrating a front wall engaging a portion of the key when a rearward directed force is applied thereto.

Another embodiment of a key 600 according to the present invention is illustrated in FIGS. 34-36. The key 600 has a main body 602 that extends from a front end 604 to a rear end 606. Towards the front end 604 is a cantilevered portion 608 that extends from a central portion 610 of the main body 602 towards the front end 604.

The key 600 also has first portion 616 and second portion 618 that extend from the central portion 610 of the main body 602 along opposite sides of the cantilevered portion 608 and end at a front wall 620. The first and second side portions 616,618 each have a flared portion 622 along opposing edges 624,626 to engage the inner connector housing 102*a* and to create a sliding dovetail. Extending along the length of the underside of the main body 602 is an opening 630 to accommodate surfaces and features disposed in the recessed portions of the inner connector housing, such as those illustrated in FIG. 29. The main body 602 has a rear surface (not shown) that faces to the front end 604 of the key 600 to provide a stop surface and prevent the key 600 from being pulled from the fiber optic connector. There may be surfaces, such as the rearward facing surface 184, in the inner connector housing 102*a* that are used to limit the movement of the key 600. On the opposite side of rear surface is another rearward facing surface 634 that may engage a rear wall 172 to prevent the key 600 from being pushed too far into the inner connector housing.

In the central area 640 of the cantilevered portion 608 and extending into the opening 630 is a latch 642. The latch 642 corresponds to and performs similar functions as the latches 342 and 120.

In this embodiment, if the key 600 engages the adapter, the front wall 620 is the structure on the key 600 that will engage the adapter. The central part 660 of the front wall 620 will move slightly in a rearward direction and over the front of the cantilevered portion 608 (and latch 642), thereby preventing the latch to move upward and away from the forward facing surface on the inner connector housing (not shown for clarity).

Figure 39:
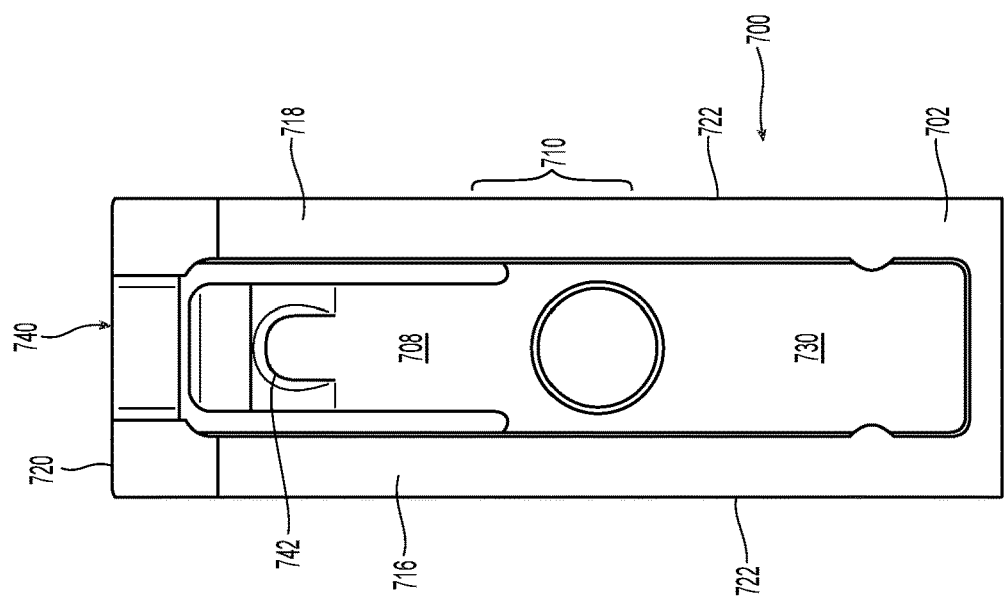
FIG. 39 is a cross section of a portion of the key in FIG. 37 illustrating a front wall after a rearward directed force is applied thereto.
Figure 37:
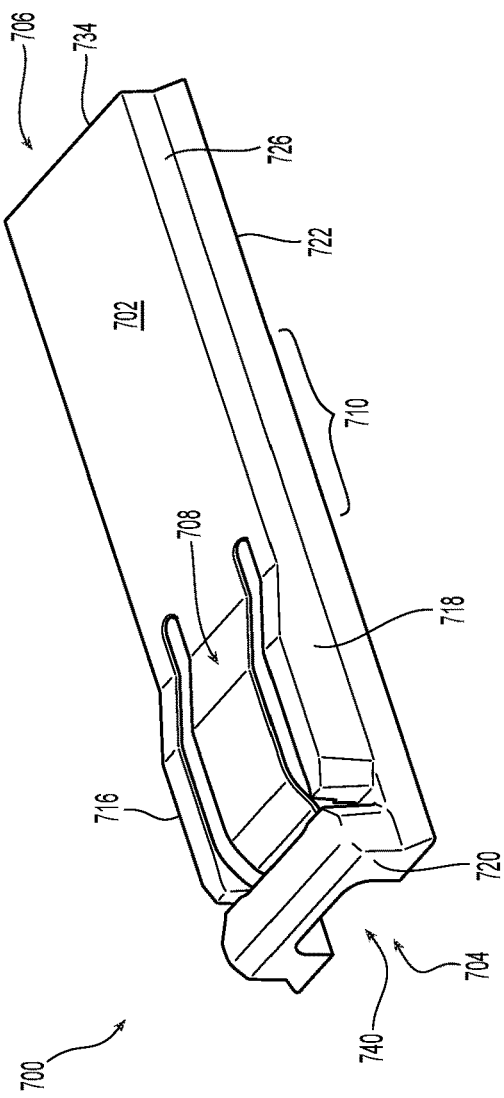
FIG. 37 is a perspective view of another embodiment of a key to be disposed in a portion of a fiber optic connector housing according to the present invention.
Figure 38:
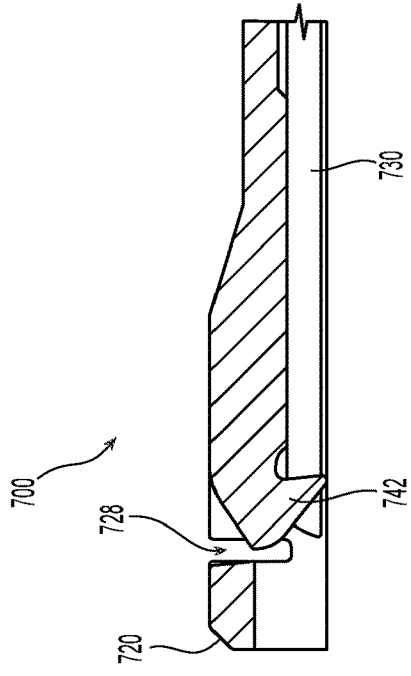
FIG. 38 is a cross section of a portion of the key in FIG. 37 illustrating a front wall before a rearward directed force is applied thereto.

Another embodiment of a key 700 according to the present invention is illustrated in FIGS. 37-39. The key 700 has a main body 702 that extends from a front end 704 to a rear end 706. Towards the front end 704 is a cantilevered portion 708 that extends from a central portion 710 of the main body 702 towards the front end 704.

The key 700 also has first portion 716 and second portion 718 that extend from the central portion 710 of the main body 702 along opposite sides of the cantilevered portion 708. The first and second side portions 716,718 each have a flared portion 722 along opposing edges 724,726 to engage the inner connector housing 102*a* and to create a sliding dovetail.

The first and second side portions 716,718 stop near the front of the cantilevered portion 708, but the lower portions on each side, where the flared portion 722 is, continue past the cantilevered portion 708 and end at a front wall 720. This causes there to be space 728 between the wall and the first and second side portions 716,718 and cantilevered portion 708. Thus, the front wall 720 is connected to the key 700 by a reduced amount of material.

Extending along the length of the underside of the main body 702 is an opening 730 to accommodate surfaces and features disposed in the recessed portions of the inner connector housing 102*a*, such as those illustrated in FIG. 29. The main body 702 has a rear surface (not shown) that faces to the front end 704 of the key 700 to provide a stop surface and prevent the key 700 from being pulled from the fiber optic connector 100. There may be surfaces, such as the rearward facing surface 184, in the inner connector housing 102*a* that are used to limit the movement of the key 700. On the opposite side of rear surface is another rearward facing surface 734 that may engage a rear wall 172 to prevent the key 700 from being pushed too far into the inner connector housing 102*a*.

In the central area 740 of the cantilevered portion 708 and extending into the opening 730 is a latch 742. The latch 742 corresponds to and performs similar functions as the other latches. See FIG. 38.

In this embodiment, if the key 700 engages the adapter, the front wall 720 is the structure on the key 700 that will engage the adapter. The front wall 720, connected to the rest of the key 700 with the reduced material, is flexible and will rotate rearward into the space 728 with the force from the adapter. The front wall 720 will engage the cantilevered portion 708 as illustrated in FIG. 39. This will keep the latch 742 from disengaging and allowing the key to move rearward.

It will be apparent to those skilled in the art that various modifications and variations can be made to the present invention without departing from the spirit and variations of this invention provided they come within the scope of the appended claims and their equivalents.

We claim:

1. A key to be disposed in a portion of a fiber optic connector housing comprising:
    a main body extending between a front end and a rear end;
    a cantilevered portion extending from a central portion of the main body towards the front end;
    first and second portions extending along of a portion of the cantilevered portion on opposite sides thereof;
    a first latch on the cantilevered portion and having a surface facing the rear end of the key and to engage a forward facing surface in the portion of the fiber optic connector housing to prevent the key from moving rearwardly upon application of a rearward force to the key.

2. The key according to claim 1, the cantilevered portion having an adapter engagement surface, the engagement surface adjacent the front end.

3. The key according to claim 1, wherein the first and second side portions have a flared portion along opposing edges to engage the fiber optic connector housing.

4. The key according to claim 1, further comprising a central opening, the central opening extending along a portion of key between the front and rear ends, the latch exending at least partially into the central opening.

5. The key according to claim 1, further comprising a second latch to engage a rearward facing surface in the fiber optic connector housing to prevent removal of the key from the fiber optic connector housing.

6. The key according to claim 1, wherein the front end of the key has a wall in front of the cantilevered portion to guard the first latch.

7. The key according to claim 1, wherein the first end has a first thickness and the second end has a second thickness, the first thickness being greater than the second thickness.

8. The key according to claim 1, further comprising a recess on each side of the cantilevered portion to engage a removal/insertion tool.

9. The key according to claim 1, wherein the first and second portions extend beyond the cantilevered portion and form a wall in front of the cantilevered portion.

10. The key according to claim 9, wherein the wall deforms to press on the cantilevered portion upon application of a rearward force to the wall.

11. The key according to claim 9, wherein the fiber optic connector housing has a longitudinal axis and the rearward facing surface and the forward facing surface engage one another at an angle that is non-perpendicular to the longitudinal axis.

12. A fiber optic connector housing comprising:
    an inner connector housing having a top portion and a bottom portion connected by two side portions;
    an outer connector housing surrounding at least a portion of the inner connector housing;
    a key disposed in a recessed portion of the inner housing, the key having a cantilevered portion extending from a central portion towards a front end thereof, a first latch disposed on the cantilevered portion and having a surface facing a rear end of the key to engage a forward facing surface in one portion of the fiber optic connector housing to prevent the key from moving rearwardly upon application of a rearward force to the the key.

13. The fiber optic connector according to claim 12, wherein the recessed portion of the inner housing has a rear wall to provide a stop for the key in a retracted position.

14. The fiber optic connector according to claim 12, wherein the key and the recessed portion form a sliding dovetail.

15. The fiber optic connector according to claim 12, further comprising first and second portions extending along of a portion of the cantilevered portion on opposite sides thereof.

16. The fiber optic connector according to claim 12, wherein the fiber optic connector housing has a longitudinal axis and the rearward facing surface and the forward facing surface engage one another at an angle that is non-perpendicular to the longitudinal axis.

17. The fiber optic connector according to claim 12, wherein a front end of the key has a wall in front of the cantilevered portion to guard the first latch.

18. The fiber optic connector according to claim 17, wherein the wall is connected to a portion of first and second portions extending along of a portion of the cantilevered portion on opposite sides thereof.

19. The fiber optic connector according to claim 17, wherein the wall deforms to press on the cantilevered portion upon application of a rearward force to the wall.

20. A key to be disposed in a portion of a housing of a fiber optic connector comprising:
    a main body extending between a front end and a rear end; and
    a cantilevered portion extending from a central portion of the main body towards the front end and having a latch thereupon, the cantilevered portion being in a relaxed first state in a first position in an adapter and being in a compressed second state when in a second position in the adapter.

* * * * *